US012711136B2

(12) United States Patent
Gupta et al.

(10) Patent No.: US 12,711,136 B2
(45) Date of Patent: Aug. 18, 2026

(54) MESSAGE TRANSFORMATION MAP OBJECT MODEL

(71) Applicant: Microsoft Technology Licensing, LLC, Redmond, WA (US)

(72) Inventors: Parikshit Kumar Gupta, Bothell, WA (US); Sanjiv Gupta, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 693 days.

(21) Appl. No.: 18/181,475

(22) Filed: Mar. 9, 2023

(65) Prior Publication Data

US 2024/0303241 A1 Sep. 12, 2024

(51) Int. Cl.
*G06F 16/2455* (2019.01)
*G06F 9/54* (2006.01)

(52) U.S. Cl.
CPC ........ *G06F 16/24564* (2019.01); *G06F 9/546* (2013.01)

(58) Field of Classification Search
None
See application file for complete search history.

(56) References Cited

U.S. PATENT DOCUMENTS 7,146,399 B2 12/2006 Fox et al.
10,516,565 B2 * 12/2019 Makovsky .......... H04L 41/0663
10,747,588 B2 * 8/2020 Bussler ................... G06F 9/541
11,909,707 B2 * 2/2024 Castello ................ H04L 51/066
2005/0022171 A1 1/2005 Langkafel et al.

(Continued)

FOREIGN PATENT DOCUMENTS

CN 101495966 A * 7/2009 ............. G06Q 20/40
WO WO-03024055 A1 * 3/2003 ............. H04L 69/08

(Continued)

OTHER PUBLICATIONS

International Search Report and Written Opinion received for PCT Application No. PCT/US2024/018572, mailed on Jul. 29, 2024, 13 pages.

(Continued)

*Primary Examiner* — Charles E Anya
(74) *Attorney, Agent, or Firm* — Wade IP Law PLLC

(57) ABSTRACT

Message transformation rules for integration platforms are represented in a computing system using transformation rule trees of objects in map object models. The transformation rule tree is an intermediate representation of the transformation rule. The objects in the tree are instantiated from classes of one or more message transformation class hierarchies. Some example classes include iterator statement, conditional statement, and expression classes. Some example expression classes include constant, variable, function, and selector classes. In a message transformation architecture, transformation rules map incoming message schemas to outgoing message schemas. Transformation engines transform incoming messages to outgoing messages by applying the map object models to select data fragments of an incoming message and construct an outgoing message, from the fragments and from computational results of routines invoked on the fragments. Map object models are not dependent on particular formats for schema definitions.

20 Claims, 22 Drawing Sheets

(56) References Cited

U.S. PATENT DOCUMENTS

| | | | | |
|---|---|---|---|---|
| 2005/0149484 | A1* | 7/2005 | Fox | G06F 16/288 |
| 2006/0031584 | A1 | 2/2006 | McKinley et al. | |
| 2006/0048107 | A1 | 3/2006 | Thiagarajan | |
| 2006/0149840 | A1* | 7/2006 | Thompson | H04L 67/55 709/224 |
| 2013/0191404 | A1 | 7/2013 | Holmes et al. | |
| 2013/0226944 | A1* | 8/2013 | Baid | G06F 16/88 707/756 |
| 2016/0321307 | A1 | 11/2016 | Dingman et al. | |
| 2019/0347341 | A1 | 11/2019 | Carr et al. | |

FOREIGN PATENT DOCUMENTS

| | | | | |
|---|---|---|---|---|
| WO | WO-2007044237 A2 * | 4/2007 | | G06F 15/16 |
| WO | WO-2018071594 A1 * | 4/2018 | | G06Q 30/0282 |

OTHER PUBLICATIONS

"Data transformation (computing)", retrieved from << https://en.wikipedia.org/wiki/Data_transformation_(computing) >>, Sep. 20, 2022, 6 pages.

"What is Data Mapping?", retrieved from << https://www.talend.com/resources/data-mapping/ >>, no later than Feb. 15, 2023, 10 pages.

Phil Zito, "Systems Integration 101: How To Create a Integration Map", retrieved from << https://blog.smartbuildingsacademy.com/systemsintegrationmap >>, Sep. 26, 2016, 7 pages.

"Integration platform", retrieved from << https://en.wikipedia.org/wiki/Integration_platform >>, Jul. 3, 2020, 2 pages.

"Enterprise application integration", retrieved from << https://en.wikipedia.org/wiki/Enterprise_application_integration >>, Oct. 21, 2022, 6 pages.

"Intermediate representation", retrieved from << https://en.wikipedia.org/wiki/Intermediate_representation >>, Dec. 19, 2022, 4 pages.

"XSLT", retrieved from << https://en.wikipedia.org/wiki/XSLT >>, Feb. 10, 2023, 10 pages.

"Fusion Middleware Developer's Guide for Oracle Application Integration Architecture Foundation Pack: 23 Working with Message Transformations", retrieved from << https://docs.oracle.com/cd/E21764_01/doc.1111/e17364/msgtransform.htm >>, Nov. 30, 2015, 26 pages.

"Logical tree structure", retrieved from << https://www.ibm.com/docs/en/integration-bus/9.0.0?topic=tree-logical-structure >>, Mar. 1, 2021, 4 pages.

"7.1 Presentation Formatting", retrieved from << https://book.systemsapproach.org/data/presentation.html >>, not later than Dec. 31, 2019, 16 pages.

"Setting the value of an output element by using a transform or a function", retrieved from << https://www.ibm.com/docs/en/integration-bus/9.0.0?topic=SSMKHH_9.0.0/com.IBM.gdm.doc/cm28521_.html >>, Mar. 1, 2021, 4 pages.

"Transforming data with mapping specifications", retrieved from << https://www.ibm.com/docs/en/iis/9.1?topic=SSZJPZ_9.1.0/com.ibm.swg.im.iis.ft.usage.doc/topics/transformscon.htm >>, Mar. 5, 2021, 3 pages.

Daniel Pluard, "HL7 to FHIR: Converting Between Healthcare Data Standards", retrieved from << https://www.intely.io/blog/hl7-to-fhir-converting-between-healthcare-data-standards/ >>, Nov. 7, 2022, 14 pages.

International Preliminary Report on Patentability received for PCT Application No. PCT/US2024/018572, mailed on Sep. 18, 2025, 10 pages.

"Logical tree structure", Retrieved From : https://www.ibm.com/docs/en/integration-bus/9.0.0?topic=tree-logical-structure, Mar. 1, 2021, 3 Pages.

"Presentation Formatting", Retrieved From: https://web.archive.org/web/20221026050001/https:/book.systemsapproach.org/data/presentation.html, Oct. 26, 2022, 16 Pages.

"Setting the value of an output element by using a transform or a function", Retrieved From: https://www.ibm.com/docs/ en/integration-bus/9.0.0?topic=SSMKHH_9.0.0/com.ibm.gdm.doc/cm28521_.html, Mar. 1, 2021, 3 Pages.

"Working with Message Transformations", Retrieved From: https://docs.oracle.com/cd/E21764_01/doc.1111/e17364/ msgtransform.htm#FPDEV1193, Retrieved on : Jan. 20, 2023, 41 Pages.

Pluard, Daniel, "HL7 to FHIR: Converting Between Healthcare Data Standards", Retrieved From: https://www.intely.io/blog/hl7-to-fhir-converting-between-healthcare-data-standards/, Nov. 7, 2022, 15 Pages.

* cited by examiner

EXAMPLE MESSAGE TRANSFORMATION METHOD 1500

EXAMPLE MAP OBJECT MODEL BUILDING METHOD 1600

```
var mapObjectModel = new MapObjectModel
{
    Version = "1.0",
    InputType = SchemaType.XML,
    OutputType = SchemaType.XML,
    SourceNamespaces = new Dictionary<string, string>
    {
        {
            "ns0",
            "http://sourceuri.dummy"
        }
    },
    TargetNamespaces = new Dictionary<string, string>
    {
        {
            "ns0",
            "http://targeturi.dummy"
        }
    },
    SourceSchemaFile = "Bookstore.xsd",
    TargetSchemaFile = "StoreReport.xsd",
    Root = new XmlMapNode
    {
        NamespacePrefix = "ns0",
        FullName = "ns0:Report",
        NodeName = "Report",
        IsRoot = true,
        Value = new ComplexValue
        {
            Children = new List<MapElement>
            {
                [to FIG. 19]
                [to FIG. 22]
```

Fig. 18

```
new XmlMapNode
{
    NamespacePrefix = "ns0",
    IsAttribute = true,
    FullName = "@ns0:IsOnlineStore",
    NodeName = "IsOnlineStore",
    Value = new FunctionExpression
    {
        Name = TransformationName.IfElse,
        Parameters = new List<Expression>
        {
            new FunctionExpression
            {
                Name = TransformationName.IsNil,
                Parameters = new List<Expression>
                {
                    new Selector
                    {
                       [to FIG. 20]
                    }
                },
                ExpressionString =
                 "is-nil(/ns0:Bookstore/ns0:Location)",
            },
            [to FIG. 21]
```

Fig. 19

```
Fragments = new List<SelectorFragment>
{
    new SelectorFragment
    {
        NodeName = "Bookstore",
        NamespacePrefix = "ns0",
        FullName = "ns0:Bookstore"
    },
    new SelectorFragment
    {
        NodeName = "Location",
        NamespacePrefix = "ns0",
        FullName = "ns0:Location"
    }
},
SelectorType = SelectorType.Absolute,
ExpressionString = "/ns0:Bookstore/ns0:Location",
```

Fig. 20

```
            new ConstantExpression
            {
                ValueType = NodeValueType.Bool,
                ExpressionString = "true",
            },
            new ConstantExpression
            {
                ValueType = NodeValueType.Bool,
                ExpressionString = "false",
            }
        },
        ExpressionString =
          "if-then-else(is-nil(/ns0:Bookstore/
          ns0:Location),$true,$false)",
    },
},
```

Fig. 21

```
new XmlMapNode
{
    NamespacePrefix = "ns0",
    FullName = "ns0:Customers",
    NodeName = "Customers",
    Value = new ComplexValue
    {
        Children = new List<MapElement>
        {
            new ForeachStatement
            {
              ItemsToIterate = new Selector
              {
                Fragments = new List<SelectorFragment>
                {
                  new SelectorFragment
                  {
                    NodeName = "Bookstore",
                    NamespacePrefix = "ns0",
                    FullName = "ns0:Bookstore"
                  },
                  new SelectorFragment
                  {
                    NodeName = "Customer",
                    NamespacePrefix = "ns0",
                    FullName = "ns0:Customer"
                  }
                },
                SelectorType = SelectorType.Absolute,
                ExpressionString =
                  "/ns0:Bookstore/ns0:Customer",
              },
              [to FIG. 23]
```

Fig. 22

```
    Each = new XmlMapNode
    {
     IsArrayItem = true,
     Value = new ComplexValue
     {
      Children = new List<MapElement>
      {
       new XmlMapNode
       {
        NamespacePrefix = "ns0",
        FullName = "ns0:Name",
        NodeName = "Name",
        Value = new Selector
        {
         Fragments = new List<SelectorFragment>
         {
          new SelectorFragment
          {
           NodeName = "Name",
           NamespacePrefix = "ns0",
           FullName = "ns0:Name"
          }
         },
         SelectorType = SelectorType.Relative,
         ExpressionString = "ns0:Name",
        },
       }
      }
     },
    }
   }
  }
 },
},
```

```
new XmlMapNode
{
    NamespacePrefix = "ns0",
    FullName = "ns0:TotalBooks",
    NodeName = "TotalBooks",
    Value = new FunctionExpression
    {
        Name = TransformationName.Count,
        Parameters = new List<Expression>
        {
            new Selector
            {
                Fragments = new List<SelectorFragment>
                {
                    new SelectorFragment
                    {
                        NodeName = "Bookstore",
                        NamespacePrefix = "ns0",
                        FullName = "ns0:Bookstore"
                    },
                    new SelectorFragment
                    {
                        NodeName = "Book",
                        NamespacePrefix = "ns0",
                        FullName = "ns0:Book"
                    }
                },
                SelectorType = SelectorType.Absolute,
                ExpressionString =
                  "/ns0:Bookstore/ns0:Book",
            }
        },
        ExpressionString =
          "count(/ns0:Bookstore/ns0:Book)",
    },
},
```

```
new ForeachStatement {
  ItemsToIterate = new Selector {
    Fragments = new List<SelectorFragment> {
      new SelectorFragment {
        NodeName = "Bookstore",
        NamespacePrefix = "ns0",
        FullName = "ns0:Bookstore"
      },
      new SelectorFragment {
        Filter = new FunctionExpression {
          Name = TransformationName.IsEqual,
          Parameters = new List<Expression> {
            new Selector {
              Fragments = new List<SelectorFragment> {
                new SelectorFragment {
                  NodeName = "Active",
                  NamespacePrefix = "ns0",
                  FullName = "ns0:Active"
                }
              },
              SelectorType = SelectorType.Relative,
              ExpressionString = "ns0:Active",
            },
            new ConstantExpression {
              ValueType = NodeValueType.Bool,
              ExpressionString = "true",
            }
          },
          ExpressionString = "is-equal(ns0:Active,$true)",
        },
        NodeName = "Customer",
        NamespacePrefix = "ns0",
        FullName = "ns0:Customer"
      }
    },
    SelectorType = SelectorType.Absolute,
    ExpressionString =
"/ns0:Bookstore/ns0:Customer[is-equal(ns0:Active,$true)]",
  },
  [to FIG. 26]
```

Fig. 25

```
Each = new XmlMapNode
{
  IsArrayItem = true,
  Value = new ComplexValue
  {
    Children = new List<MapElement>
    {
      new XmlMapNode
      {
        NamespacePrefix = "ns0",
        FullName = "ns0:ActiveCustomer",
        NodeName = "ActiveCustomer",
        Value = new ComplexValue
        {
          Children = new List<MapElement>
          {
            new XmlMapNode
            {
              NamespacePrefix = "ns0",
              FullName = "ns0:Name",
              NodeName = "Name",
              Value = new Selector
              {
                Fragments = new List<SelectorFragment>
                {
                  new SelectorFragment
                  {
                    NodeName = "Name",
                    NamespacePrefix = "ns0",
                    FullName = "ns0:Name"
                  }
                },
                SelectorType = SelectorType.Relative,
                ExpressionString = "ns0:Name",
              },
            },
            [to FIG. 27]
```

Fig. 26

```
              new XmlMapNode
              {
                NamespacePrefix = "ns0",
                FullName = "ns0:Age",
                NodeName = "Age",
                Value = new Selector
                {
                  Fragments = new List<SelectorFragment>
                  {
                    new SelectorFragment
                    {
                      NodeName = "Age",
                      NamespacePrefix = "ns0",
                      FullName = "ns0:Age"
                    }
                  },
                  SelectorType = SelectorType.Relative,
                  ExpressionString = "ns0:Age",
                },
              }
            }
          },
        }
      }
    },
  }
},
```

```
new ForeachStatement {
 ItemsToIterate = new Selector {
  Fragments = new List<SelectorFragment> {
   new SelectorFragment {
    NodeName = "Bookstore",
    NamespacePrefix = "ns0",
    FullName = "ns0:Bookstore"
   },
   new SelectorFragment {
    Filter = new FunctionExpression {
     Name = TransformationName.IsEqual,
     Parameters = new List<Expression> {
      new Selector {
       Fragments = new List<SelectorFragment> {
        new SelectorFragment {
         NodeName = "Availability",
         NamespacePrefix = "ns0",
         FullName = "ns0:Availability"
        }
       },
       SelectorType = SelectorType.Relative,
       ExpressionString = "ns0:Availability",
      },
      new ConstantExpression {
       ValueType = NodeValueType.String,
       Quote = StringQuotationType.Double,
       ExpressionString = "Available",
      }
     },
     ExpressionString =
       "is-equal(ns0:Availability,\"Available\")",
    },
    NodeName = "Book",
    NamespacePrefix = "ns0",
    FullName = "ns0:Book"
   }
  },
  SelectorType = SelectorType.Absolute,
  ExpressionString =
"/ns0:Bookstore/ns0:Book[
is-equal(ns0:Availability,\"Available\")]",
 },
 [to FIG. 29]
```

Fig. 28

```
Each = new XmlMapNode {
 IsArrayItem = true,
 Value = new ComplexValue {
  Children = new List<MapElement> {
   new XmlMapNode {
    NamespacePrefix = "ns0",
    FullName = "ns0:AvailableBook",
    NodeName = "AvailableBook",
    Value = new ComplexValue {
     Children = new List<MapElement> {
      new XmlMapNode {
       NamespacePrefix = "ns0",
       FullName = "ns0:BookName",
       NodeName = "BookName",
       Value = new Selector {
        Fragments = new List<SelectorFragment> {
          new SelectorFragment {
           NodeName = "Name",
           NamespacePrefix = "ns0",
           FullName = "ns0:Name"
          }
         },
         SelectorType = SelectorType.Relative,
         ExpressionString = "ns0:Name",
        },
       },
       new XmlMapNode {
        NamespacePrefix = "ns0",
        FullName = "ns0:Author",
        NodeName = "Author",
        Value = new Selector {
         Fragments = new List<SelectorFragment> {
          new SelectorFragment {
           NodeName = "Author",
           NamespacePrefix = "ns0",
           FullName = "ns0:Author"
          }
         },
         SelectorType = SelectorType.Relative,
         ExpressionString = "ns0:Author",
        },
       },
       [to FIG. 30]
```

Fig. 29

```
          new XmlMapNode
          {
           NamespacePrefix = "ns0",
           FullName = "ns0:BookLocation",
           NodeName = "BookLocation",
           Value = new Selector
           {
            Fragments = new List<SelectorFragment>
            {
             new SelectorFragment
             {
              NodeName = "LocationCode",
              NamespacePrefix = "ns0",
              FullName = "ns0:LocationCode"
             }
            },
            SelectorType = SelectorType.Relative,
            ExpressionString = "ns0:LocationCode",
           },
          }
         }
        },
       }
      }
     },
    }
   },
   new IfElseStatement()
  }
 }
}
};
```

Fig. 30

MESSAGE TRANSFORMATION MAP OBJECT MODEL

BACKGROUND

Many modern devices in a broad range of fields have some form of computing power, and operate according to software instructions that execute using that computing power. A few of the many examples of devices whose behavior depends on software include cars, planes, ships and other vehicles, robotic manufacturing tools and other industrial systems, medical devices, cameras, inventory management and other retail or wholesale systems, smartphones, tablets, servers, workstations and other devices which connect to the Internet.

The firmware, operating systems, applications, and other software programs which guide various behaviors of these and many other computing devices are developed by people who are known as developers, programmers, engineers, or coders, for example; they are referred to collectively here as "developers". Developers interact with source code editors, compilers, debuggers, and various other software development tools as they develop software programs. The resulting software programs provide widespread beneficial effects in businesses, government agencies, educational institutions, research facilities, health care facilities, and many other organizations.

Some software programs are able to receive digital messages containing data from other software programs, if the messages are structured in a way the receiving software programs are able to process. Often, however, the structure of a message from a first software program does not match the message structure expected by a second software program. Particular data may reside in a different position within each of the two message structures, for example. Some efforts to address message structure inconsistencies include efforts to standardize message structure, formal or informal policies favoring programs that use compatible message structures, and ad hoc conversion tools which translate data from a particular message structure X to a different message structure Y.

Although many advances have been made, improvements in the computer technologies which address differences between program message structures remain possible, and are worth pursuing.

SUMMARY

Some embodiments described herein create, provide, or utilize a message transformation map object model residing in and configuring a computing system memory. The message transformation map object model computationally represents a transformation rule for transforming data from one message structure to another message structure. The message transformation map object model includes a transformation rule tree of objects. The objects instantiate classes which are arranged hierarchically. The tree includes objects that represent piecewise construction of an outgoing message in an outgoing message structure.

In some embodiments, the outgoing message is constructed by a transformation engine according to selector objects of the tree which represent selections of fragments of an incoming message that has an incoming message structure. Depending on the particular message structures, the tree includes zero or more iterator statement objects, conditional statement objects, variable objects, constant expression objects, and function expression objects.

In some embodiments, the message transformation map object model is an intermediate representation of the transformation rule which persists apart from the transformation engine and its executions. Message structure formats are noted in message transformation map object model, but the model is otherwise independent of any particular message structure format.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIGS. 18 to 30 collectively show a textual description of a map object model.

DETAILED DESCRIPTION

Overview

Figure 1:
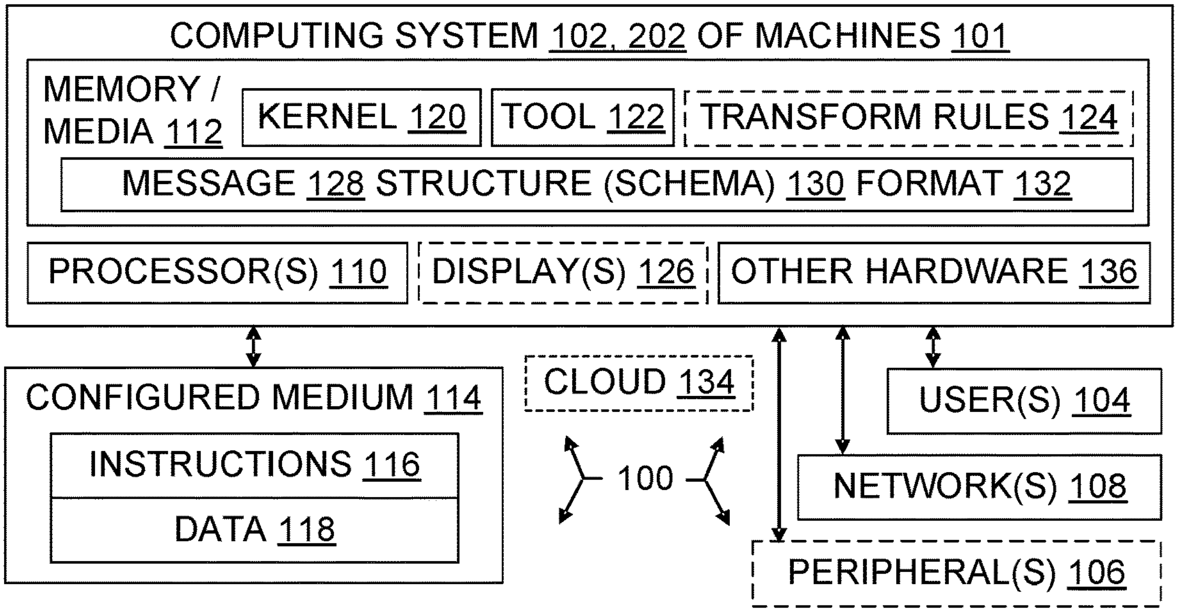
FIG. 1 is a diagram illustrating aspects of computer systems and also illustrating configured storage media, including some aspects generally suitable for systems which provide message transformation functionality.

Innovations may expand beyond their origins, but understanding an innovation's origins can help one more fully appreciate the innovation. In the present case, some teachings described herein were motivated by technical challenges faced by Microsoft innovators who were working to improve integration technology for message transformation, particularly for messages sent between enterprise software programs.

Integration technology is a technical field within the much larger field of computing technology. A service or product (a "solution") in the field of integration technology is sometimes referred to as an Enterprise Integration Platform as a Service (EIPaaS) or as an Integration Platform as a Service (IPaaS); these solutions are collectively referred to herein as "integration platforms". An integration platform is a platform for building and deploying integrations of disparate programs. Part of an integration includes transforming messages as needed to permit different programs of a computing system, especially different application programs, to communicate digitally and proactively with each other. The application programs may be running on the same machine as each other, or on different machines.

A familiar approach to implementing message transformation includes writing an ad hoc convertor program; when such a convertor is used, the message transformation is referred to herein as "conversion" to help clarify the absence of embodiments taught herein. The convertor program is written, e.g., in a programming language such as C, C#, or Java. The convertor reads in data from an incoming message and outputs the data in a rearranged form as an outgoing message. If the incoming message structure or the outgoing message structure changes, or if additional message structure(s) are to be converted, then the source code of the convertor is modified by a developer. After the source code is modified, the convertor is recompiled and redeployed as part of an integration. Message structures are also referred to as "message schemas".

A change in the format used to document message structures often requires modifications to convertor source code, even if the underlying message structure did not change. For example, if a convertor is written to parse only an XML definition of message structure, then the convertor would require 20 modifications in order to parse a JSON definition of message structure, or vice versa. The modified convertor code is then recompiled and redeployed.

Ad hoc convertors have disadvantages. Someone who is trying to understand the message structures and how they should relate to each other could perhaps look at the same message structure documentation as the developer who implemented the convertor. However, the message structure documentation may be ambiguous, incomplete, or unclear with regard to a particular transformation. To determine the message structure conversion that is actually being performed by the convertor, one must sometimes experiment with different inputs to the convertor, or examine the convertor's source code, or both.

Thus, it is difficult or impractical for non-developers, or developers who lack access to a convertor's source code, to understand the message structure conversion being done by the convertor. It is even more difficult and impractical for non-developers to make changes in the conversion, or to expand the set of message structures being converted, or to expand the set of message structure description formats the convertor recognizes. It is also difficult or impractical to re-use the convertor for different conversions; only a fraction of the convertor source code that is not specific to a particular conversion can be reused. The convertor will need to be modified to process different message structures or message structure formats, after which it must be recompiled and redeployed.

A somewhat different approach is to utilize XSLT, a language originally designed for transforming XML documents. XSLT is a Turing Complete language, so its use for transforms is not limited to XML, although in practice XSLT source code resembles XML code. However, XSLT shares both functionality and disadvantages with ad hoc convertors.

The innovators hypothesized that improvements were possible. They devised an intermediate representation of a transformation rule which is based on a tree of objects instantiated from certain class hierarchies. These transformation rule trees are not tied to particular message structure description formats such as XML or JSON, and they are not necessarily embedded in convertor programs or similar constructs such as XSLT programs. The transformation rules are mapped to transformation map object models (transformation rule trees) that provide a uniform model of message transformation rules.

Unlike convertors, message transformation rule map object models are distinct from a transformation engine that performs the transformation. That is, in addition to a map object model, some enhanced computing system embodiments include a transformation engine which is configured to upon execution apply the transformation rule set to an incoming message. This separation of functionality provides technical benefits. A computational model (map object model) of a message transformation rule can be changed without changing the transformation engine code, and vice versa. A given transformation engine can parse and execute multiple different map object models. The map object models are not embedded in the transformation engine, in contrast with the way conversions are embedded in convertors and in XSLT programs.

Another technical benefit is that map object models are not limited to a particular authoring tool, such as being limited to an XSLT editor, an XML editor, or a JSON editor. In some embodiments, the same map object model can be authored by different tools in any of these formats, provided that the underlying incoming message structure and the underlying outgoing message structure are the same in each format. This promotes flexibility and scope in the set of interactions between people and transformation rule authoring tools.

In some embodiments, the map object model is an intermediate representation of the transformation rule. That is, the map object model represents the structure of the incoming message, the structure of the outgoing message, and the mapping from the incoming structure (and the data of a particular incoming message) to the outgoing structure (and data of the particular corresponding outgoing message).

Some embodiments include a message transformation map object model residing in and configuring a computing system memory, the message transformation map object model computationally representing a transformation rule set which includes at least one transformation rule, the message transformation map object model including an instance of a map object model class which identifies a root map node of a transformation rule tree of objects. This map object model provides the technical benefit of separating a computational model of a message transformation rule from software that executes the message transformation rule. Because the message transformation map object model is not embedded in source code of a converter or in code such as XSLT code, the set of format(s) in which message structures are described can be modified without changing the source code or executable code of a transformation engine that executes the transformation rule(s). This promotes efficient use of computational resources and personnel by reducing a need for recompilations and redeployments.

In some embodiments, the map object model transformation rule tree includes a conditional statement object representing a conditional statement execution to conditionally perform transformation upon an application of the transformation rule set to the incoming message. This conditional statement object provides the technical benefit of permitting a message transformation to conditionally include incoming message data in an outgoing message.

Figure 5:
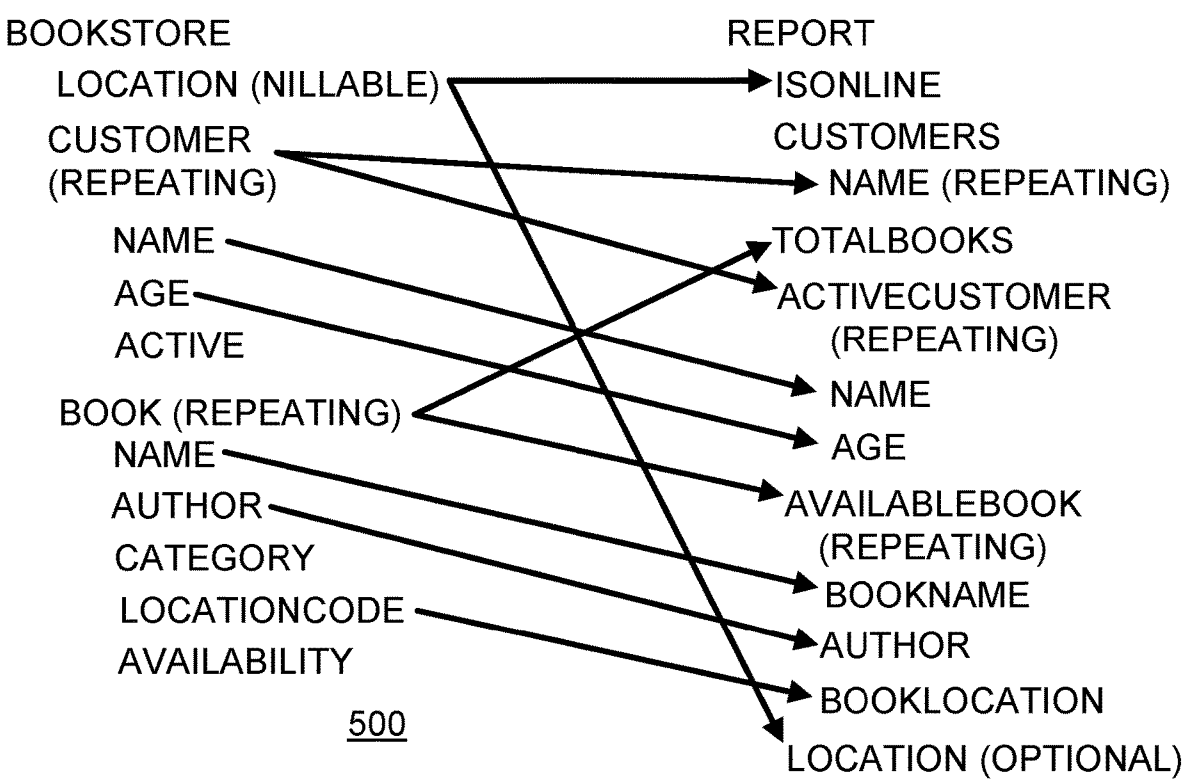
FIG. 5 is a transformation map diagram illustrating a mapping between an incoming message structure and an outgoing message structure.

For example, in an example transformation illustrated in FIG. 5, an incoming message schema is shown on the lefthand side and an outgoing message schema is shown on the righthand side. A bookstore location in an incoming message is can be nil (a.k.a. null), depending on whether the location is online or physical (bricks and mortar). If the location data indicates an online location, e.g., an URL, then the report is-online attribute in the outgoing message is set TRUE and the optional report location data field is not placed in the outgoing message. On the other hand, if the bookstore location data indicates a physical location, e.g., a street address, then the report is-online attribute in the outgoing message is set FALSE and the optional report location data field holding the physical location data is placed in the outgoing message.

In some embodiments, the map object model transformation rule tree includes a function expression object representing a function expression upon an application of the transformation rule set to the incoming message, the function expression object specifying a transformation at the level of individual part(s) of the incoming message. This function expression statement object provides the technical benefit of permitting a message transformation to include, in an outgoing message, function computation results derived from incoming message data.

For example, in the FIG. 5 example transformation, a report total-books field in the outgoing message is computed as a count of the number of bookstore book repeating nodes. If there are seven bookstore books, represented by seven respective bookstore book nodes, then total-books is set to seven, for instance. In a variation, suppose the bookstore message schema included bookstore book retail-price fields, indicating the retail price of each book. Then the tree could include a function expression object for a sum function, instructing the transformation engine to calculate a sum of retail-price data and then place the sum in a total-retail-prices field in the outgoing message.

In some embodiments, the map object model transformation rule tree includes an iterator statement object representing an iterator statement execution to iteratively perform transformation upon an application of the transformation rule set to the incoming message. This iterator statement object provides the technical benefit of permitting a message transformation to efficiently and accurately include, in an outgoing message, data derived iteratively from incoming message data.

For example, in the FIG. 5 example transformation, a transformation engine guided by the transformation map object model iterates through multiple bookstore customer repeating nodes of a particular incoming message to place respective customers name fields in a corresponding outgoing message.

Similarly, the transformation engine is guided by the transformation map object model to iterate through multiple bookstore customer name and customer age fields to place respective active-customers name and age fields in the outgoing message. Report available-book fields such as book-name, author, and book-location are likewise produced using iteration through bookstore book nodes.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 326 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, system integrators, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 134 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software apps 212, on mobile devices 102 or workstations 102 or servers 102, compilers and debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Unless stated otherwise, the applications 212 are distinct tools, with any two applications 212 that send or receive a message neither contained within the other application. In some cases, each application 212 is capable of running usefully to at least a limited extent without the other application running at all.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: hardware logic components 110, 136 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 136, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 136 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, message transformation functionality 206 is installed on an air gapped network and then updated periodically or on occasion using removable media 114, or is not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

In any later application that claims priority to the current application, reference numerals may be added to designate items disclosed in the current application. Such items may include, e.g., software, hardware, steps, processes, systems, functionalities, mechanisms, data structures, computational resources, languages, tools, workflows, or algorithm implementations, or other items in a computing environment, which are disclosed herein but not associated with a particular reference numeral herein. Corresponding drawings may also be added.

More About Systems

Figure 2:
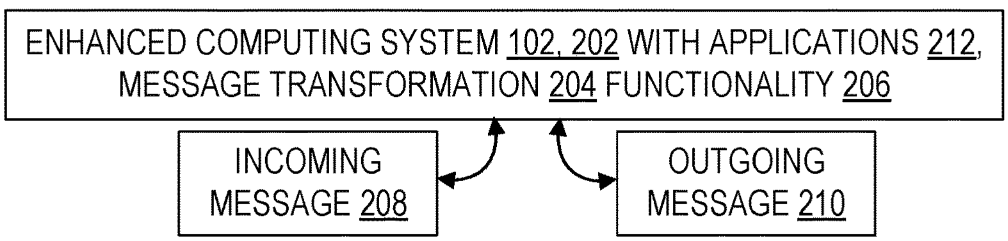
FIG. 2 is a block diagram illustrating an enhanced system configured with a message transformation functionality.

FIG. 2 illustrates a computing system 102 configured by one or more of the message transformation enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
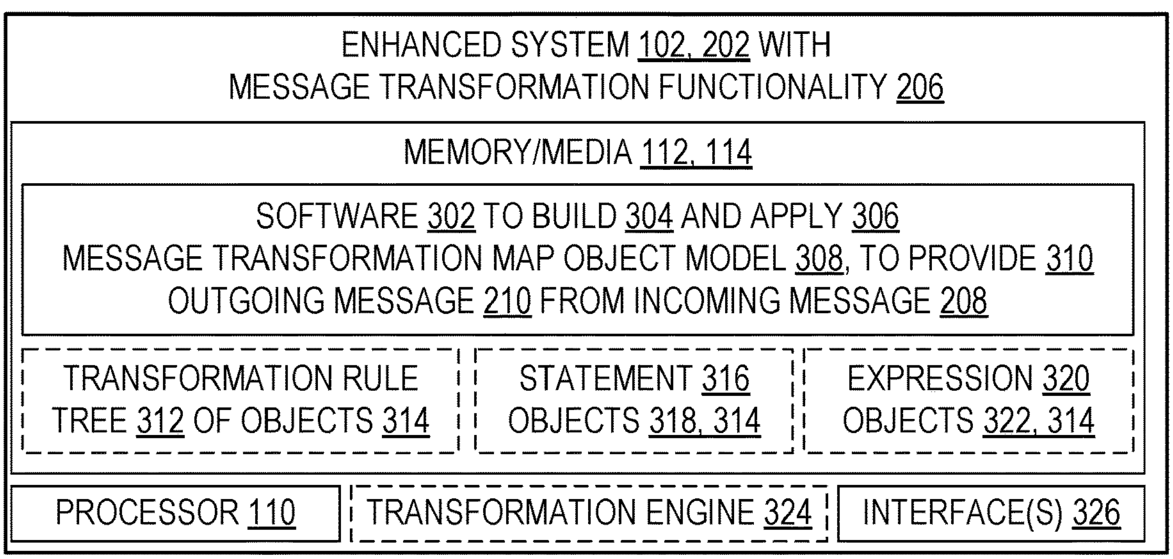
FIG. 3 is a block diagram illustrating aspects of a system enhanced with various aspects of message transformation functionality.

FIG. 3 shows some aspects of some enhanced systems 202. This is not a comprehensive summary of all aspects of enhanced systems 202 or all aspects of message transformation functionality 206. Nor is it a comprehensive summary of all aspects of an environment 100 or system 202 or other context of an enhanced system 202, or a comprehensive summary of all message transformation mechanisms 206 for potential use in or with a system 102. FIG. 3 items are discussed at various points herein, and additional details regarding them are provided in the discussion of a List of Reference Numerals later in this disclosure document.

Figure 4:
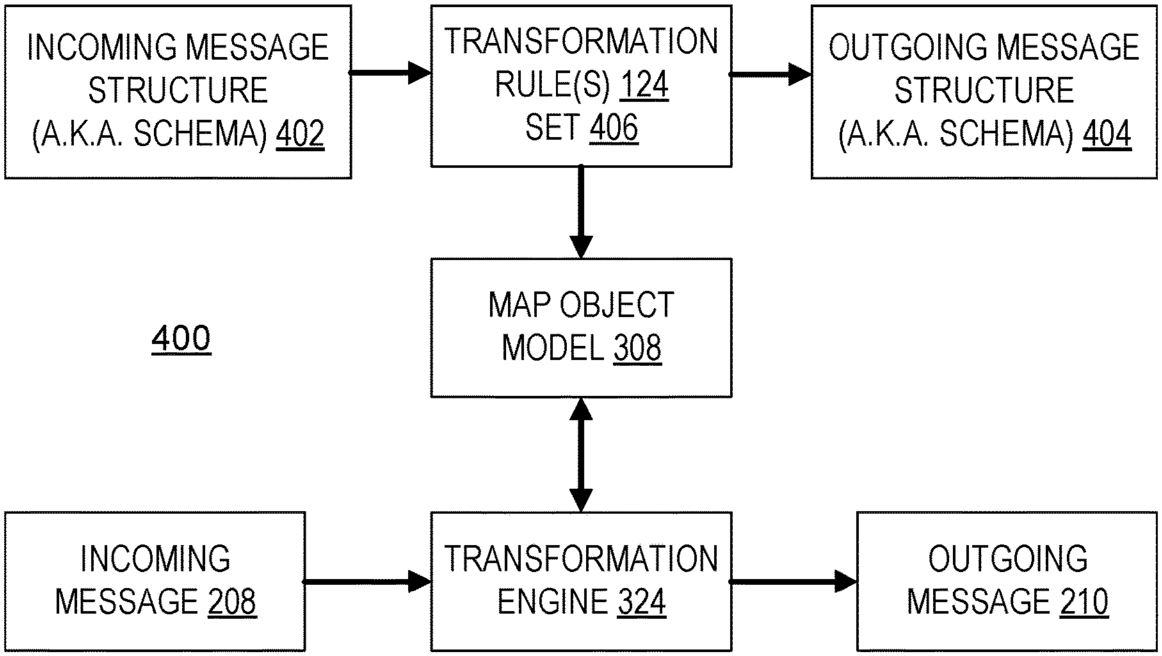
FIG. 4 is a data flow diagram illustrating aspects of a system enhanced with various aspects of message transformation functionality.

FIG. 4 shows a data flow diagram illustrating aspects of a system enhanced with various aspects of message transformation functionality; FIG. 4 also serves as a message transformation architecture diagram. FIG. 4 items are discussed at various points herein, and additional details regarding them are provided in the discussion of a List of Reference Numerals later in this disclosure document.

FIG. 5 shows a transformation map diagram illustrating an example, which is detailed in FIGS. 18 to 30. The example includes a mapping indicated in the diagram by arrows between an incoming message structure and an outgoing message structure. The message structures are indicated by example field names of an incoming message schema and an outgoing message schema, which each schema's hierarchy indicated by indentation.

FIG. 5 shows one example. Schema aspects or mapping aspects illustrated in FIG. 5, such as nillable fields, repeating fields, attributes such as the Boolean field is-online-store, conditional statements, iterator statements, and function statements, do not necessarily appear at all or in the same combination in other transformations. Individual data items such as name or age are referred to as "fields". Groups of data items such as bookstore, book, report, or active-customer are referred to as "nodes". FIG. 5 is discussed at various points herein.

FIGS. 6 to 13 show message transformation class hierarchy examples and some related items. They are discussed at various points herein, including in detail below under the heading "More About Map Object Model Classes and Objects".

Figure 15:
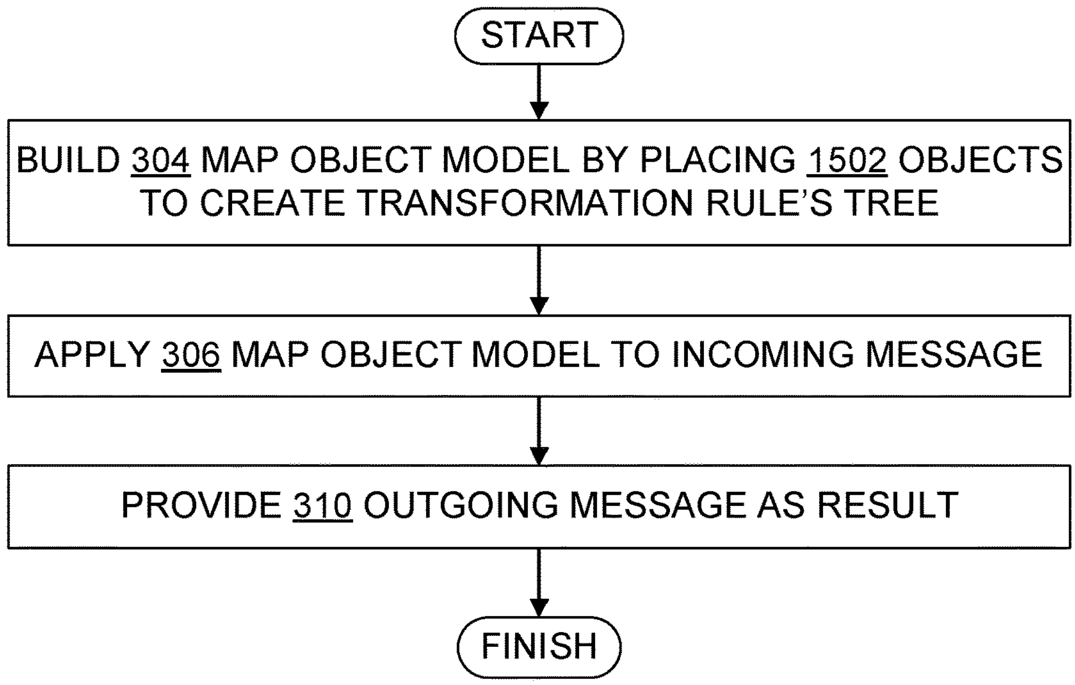
FIG. 15 is a flowchart illustrating steps in a message transformation method.
Figure 16:
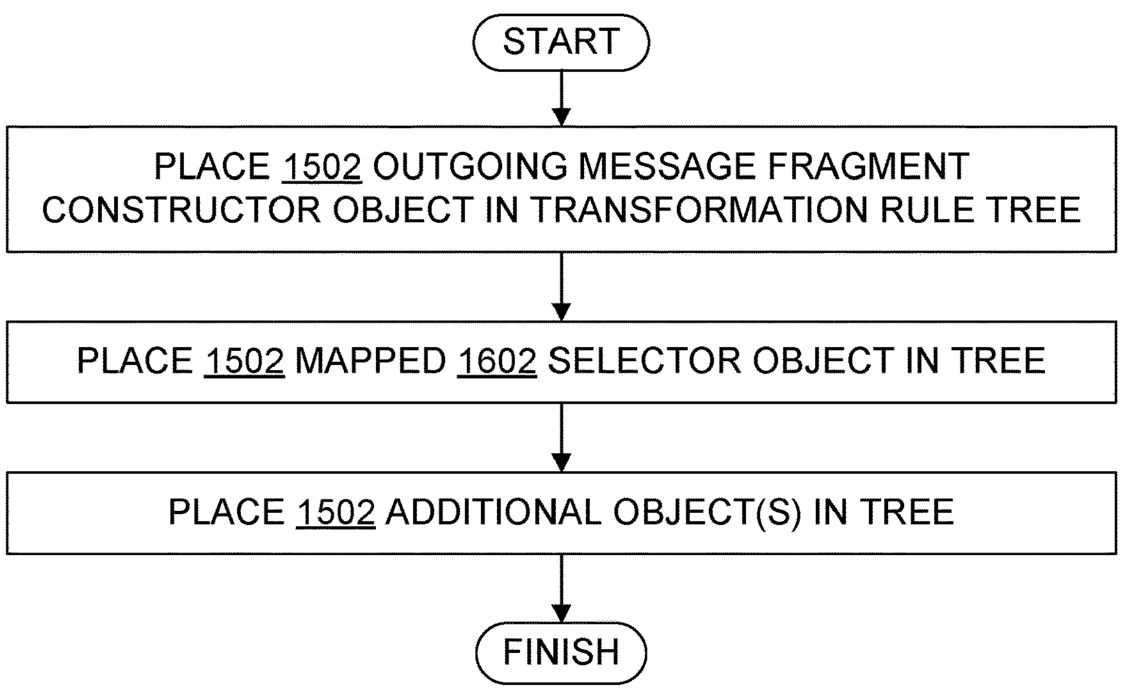
FIG. 16 is a flowchart illustrating steps in a map object model building method.
Figure 17:
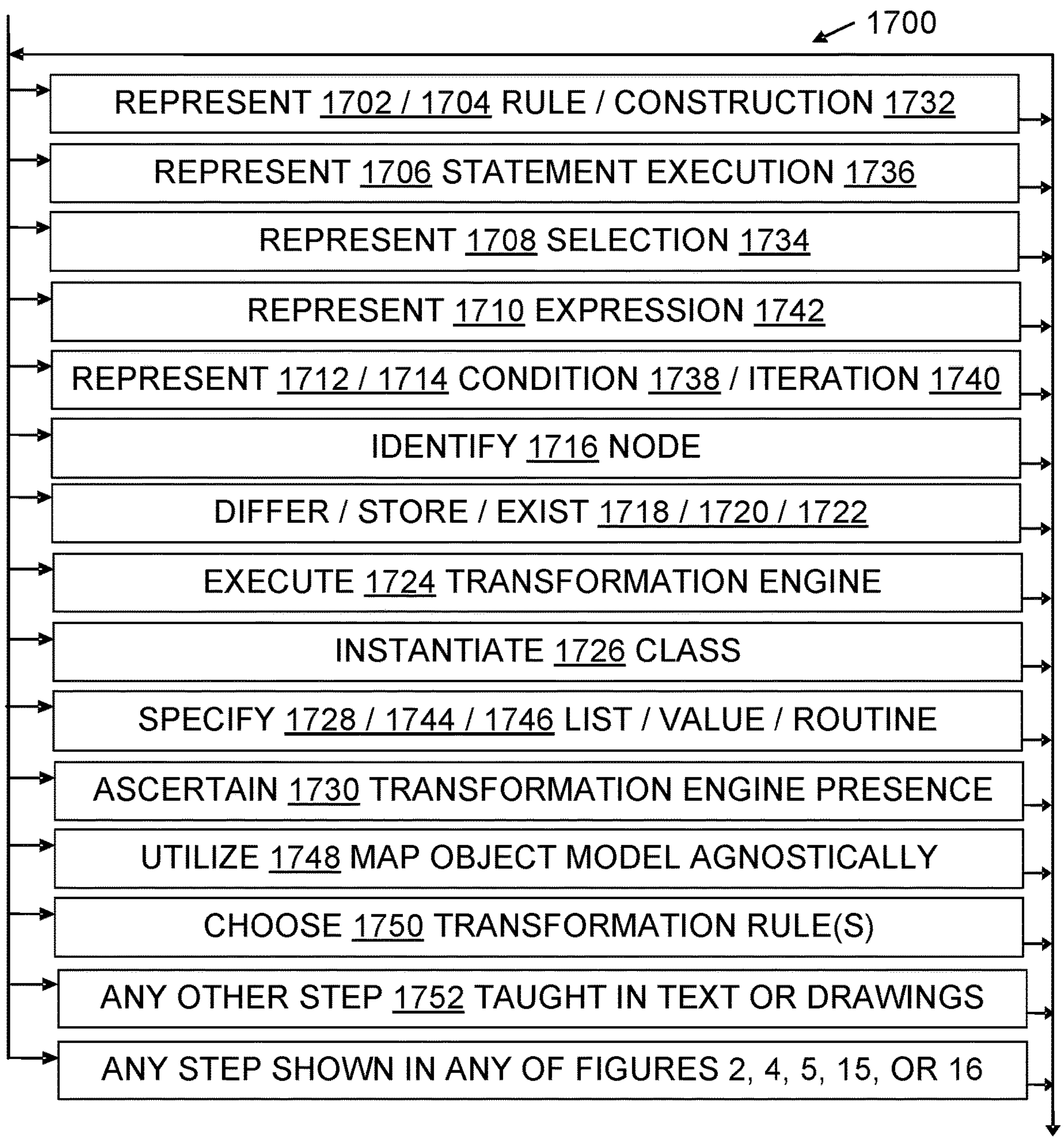
FIG. 17 is a flowchart further illustrating steps in some message transformation methods, and incorporating FIGS. 15 and 16.

FIGS. 15 to 17 illustrate methods of system 202 operation. FIGS. 18 to 30 show a textual listing of a map object model 308 implementation.

In some embodiments, the enhanced system 202 is networked through an interface 326. In some, an interface 326 includes hardware such as network interface cards, software such as network stacks, APIs, or sockets, combination items such as network connections, or a combination thereof.

In some embodiments, a computing system 202 has a map object model 308 that includes a tree 312 of objects 314, with at least one outgoing message fragment constructor 1410 mapped 1602 in the tree to a selector object 1108. For example, in a map object model consistent with FIG. 5, a book-name object serves as an outgoing message fragment constructor 1410 mapped to a selector object 1108 which selects data from the incoming message book name field 1428.

Some embodiments include a message transformation computing system 202 which includes: a digital memory 112 and a processor set 110 including at least one processor, the processor set in operable communication with the digital memory. The system 202 is configured to configured to facilitate transforming 204 an incoming message 208 having an incoming message structure 402, 130 into an outgoing message 210 having an outgoing message structure 404, 130. A message structure 130 is also sometimes called the message "schema" 130.

Some embodiments include a message transformation map object model 308 residing in and configuring the memory. The message transformation map object model computationally represents 1702 a transformation rule set 406 which includes at least one transformation rule 124. The message transformation map object model includes an instance 314 of a map object model class 1402 which identifies 1716 a root map node 606, 1406 of a transformation rule tree 312 of objects 314.

In some embodiments, the transformation rule tree 312 of objects includes an outgoing message fragment constructor object 1410 which represents 1704 a construction 1732 of an outgoing message fragment 1412 of the outgoing message 210 based on the outgoing message structure 404, 130. The outgoing message fragment constructor is positionally mapped 1602 in the transformation rule tree of objects to a selector object 1108 which represents 1708 a selection 1734 of an incoming message fragment 1412 of the incoming message 208 based on the incoming message structure 402.

Objects 314 are instances 314 of non-abstract classes 1402; some classes 1402 are abstract classes 1402 which are not themselves instantiated but which help define one or more non-abstract classes in a class hierarchy 1420. The term "abstract class" is a computing technology term of art, not a legal conclusion. Abstract classes are not instantiated, but they can be subclassed, i.e., their members 1422 can be inherited by another class that is lower than them in a class hierarchy. FIGS. 6 to 13 show class hierarchies; a hierarchy (tree) often contains sub-hierarchies (subtrees) which are themselves hierarchies (trees).

For convenience, and when one of skill would understand that reference is being made to a class X as opposed to reference being made to an object which is an instance of the class X, classes and their respective object instances are referred to herein by the same name and reference number.

Figure 9:
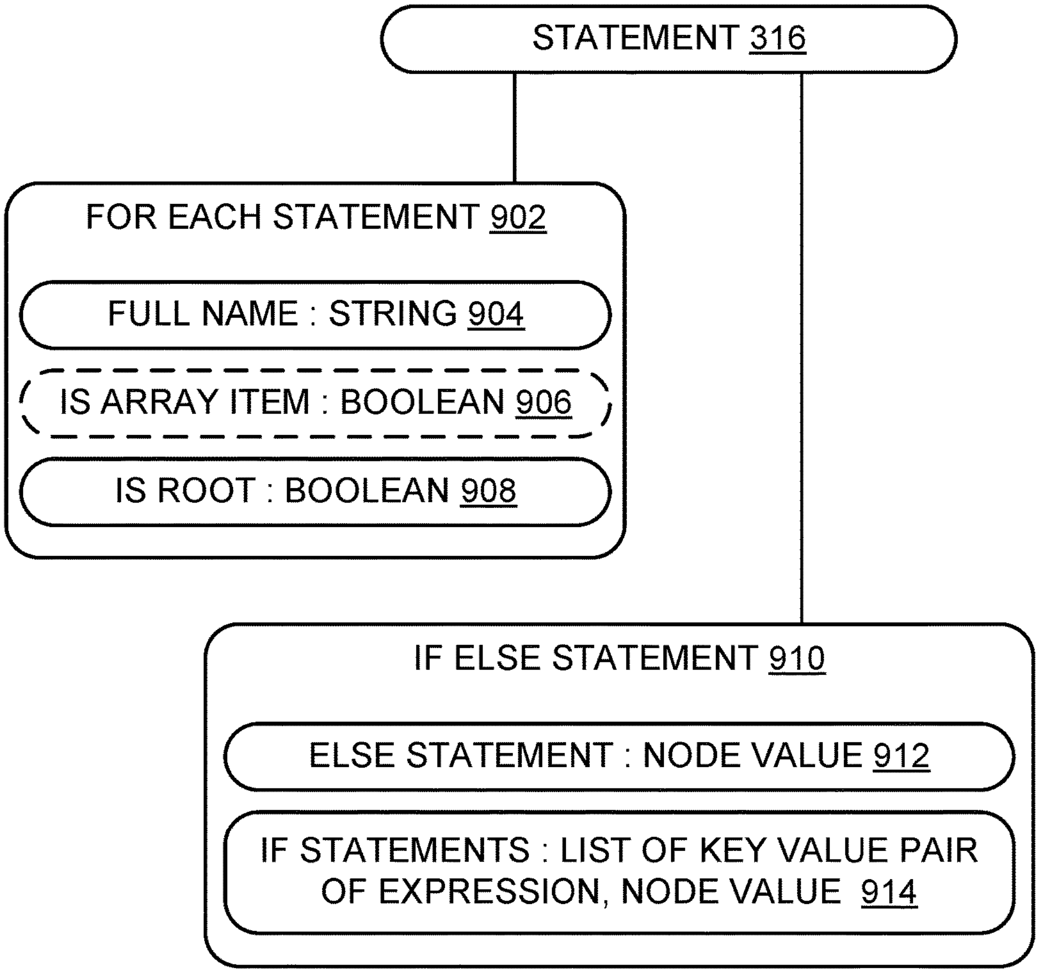
FIG. 9 is a class hierarchy diagram illustrating the statement abstract class, a for-each statement class which is an example of an iterator statement class, and an if-else statement class which is an example of a conditional statement class.
Figure 14:
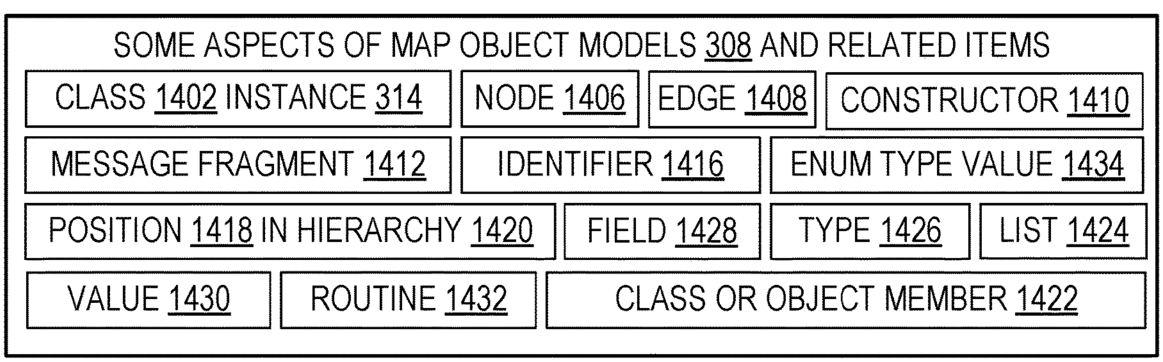
FIG. 14 is a block diagram illustrating aspects of map object models and related items.

Thus, in a discussion of classes or a discussion of the class hierarchy shown in FIG. 9, "for-each statement 902" refers to a for-each class, whereas in a discussion of objects or a discussion of a transformation rule tree 312, "for-each statement 902" refers to a for-each statement object that is an instance of the for-each statement class. Similarly, when the context of discussion is a class, "member 1422" refers to a class member, whereas when the context of discussion is an object, "member 1422" refers to an object member. Fields 1428 are object 314 members 1422. Objects 314 may also be called "nodes 1406" when they are part of a tree of objects, in which case edges 1408 connect them to form the tree.

Some embodiments further include a transformation engine 324 which is configured to upon execution apply 306 the transformation rule set to the incoming message. Applying 306 includes traversing the transformation rule set tree 312 and constructing (e.g., emitting, producing, assembling in memory) an outgoing message whose content is selected according to the tree's selector objects 1108 and function expression objects 1114, for example, subject to conditional statement objects 910 and iterator statement objects 902, if any.

However, there need not be any conditional statement or iterator statement present for the map object model 308 to be complete and correct. A purpose of an iterator statement is to define a rule for creating repeating structure in the output message. A purpose of a conditional statement is for creating a node optionally in the output message. A schema in some cases defines certain nodes as repeating, or optional, or both.

In some embodiments, the transformation rule tree of objects includes at least one of: a conditional statement object 910 representing 1712 a conditional statement execution 1736 to conditionally 1738 perform transformation upon an application 306 of the transformation rule set to the incoming message; or an iterator statement object 902 representing 1714 an iterator statement execution to iteratively 1740 perform transformation upon an application 306 of the transformation rule set to the incoming message.

In some embodiments, the transformation rule tree of objects includes at least one of: a constant expression object 1102 representing 1710 a constant expression 1742 upon an application 306 of the transformation rule set to the incoming message, the constant expression object specifying a constant value 1430 and a constant value type 1426; or a function expression object 1114 representing a function expression 1742 upon an application 306 of the transformation rule set to the incoming message, the function expression object specifying a transformation routine 1432.

Other system embodiments are also described herein, either directly or derivable as system versions of described processes or configured media, duly informed by the extensive discussion herein of computing hardware. Descriptions of message transformation class hierarchies (e.g., FIGS. 6 to 13 and accompanying text), and descriptions of message transformation examples and implementations (e.g., FIGS. 5 and 18 to 30, and accompanying text) also help describe system embodiments and method or configured storage device embodiments.

Although specific message transformation architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of transformation routine functionality, iterator statement functionality, or conditional statement functionality, for example, as well as different technical features, aspects, mechanisms, software, expressions, operational sequences, data structures, environment or system characteristics, or other functionality consistent with teachings provided herein, and may otherwise depart from the particular examples provided.

More About Map Object Model Classes and Objects

FIGS. 6 to 13 show message transformation class hierarchy examples and some related items. In these classes 1402 and their instantiations 314, "source" refers to an incoming message or an incoming message schema, while "target" refers to an outgoing message or an outgoing message schema.

Different notations are used with variations of hyphens, underscores, spaces, capitals, or other variations to mean the same item, e.g., "for-each", "for_each", "for each", "For Each", "ForEach", and so on each have the same meaning herein. Also, some programming languages use a notation such as "Dictionary<string, string>" for map object model class 308 members 608, 614, and a notation such as "List<KeyValuePair<Expression, NodeValue>>" for the data type in IfElseStatement class 910 member 914.

Figure 6:
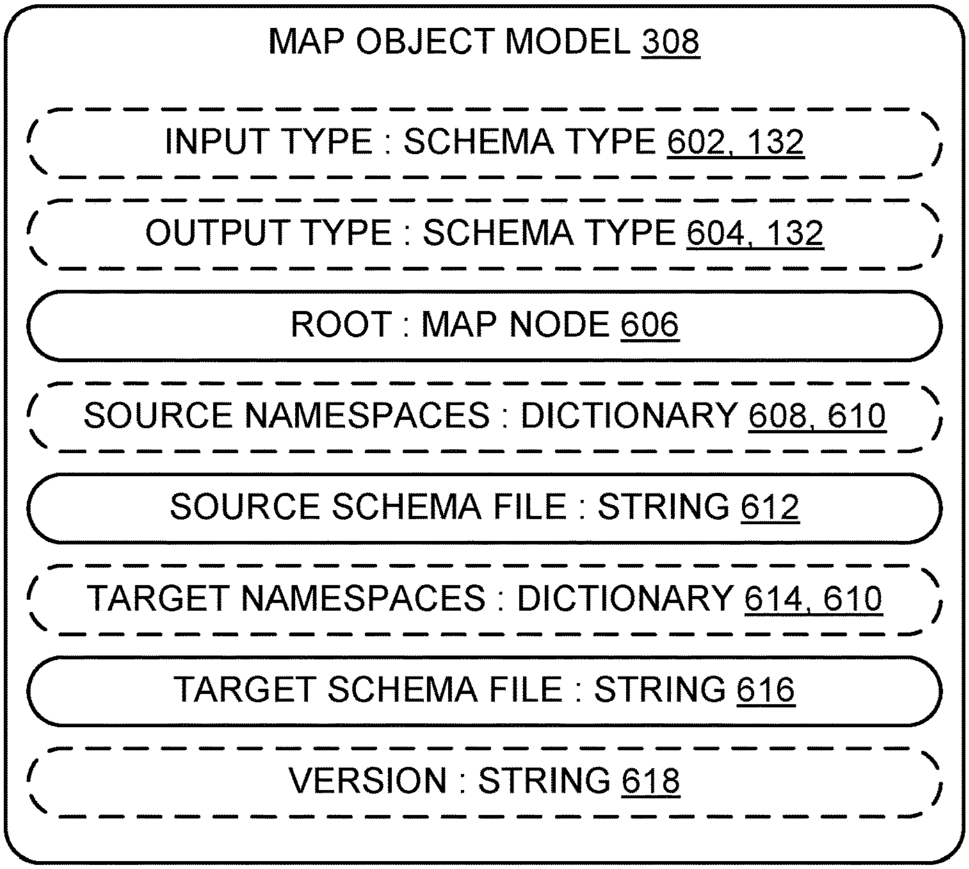
FIG. 6 is a block diagram illustrating a first version of a map object model class.

FIG. 6 shows a first version of a map object model class 308; for convenience reference numeral 308 also refers to a map object model, which is built from map object model class 308 and other classes shown in the Figures or discussed herein or both. As indicated by dashed outlines in FIG. 6, variations of the map object model class 308 may omit schema type members 602 and 604, may omit namespace members 608 and 614, may omit a version member 618, or may exhibit two or all three of these omissions. The data types of class members (and hence of fields in instantiated classes) are shown after the name of the class member. For example, the map object model class member 606 named "root" has data type map node, which is another class; see FIG. 8. Similarly, the map object model class member 618 named "version" has data type string, which is a basic or primitive type as opposed to being another class. Boolean is another basic or primitive type.

Figure 7:
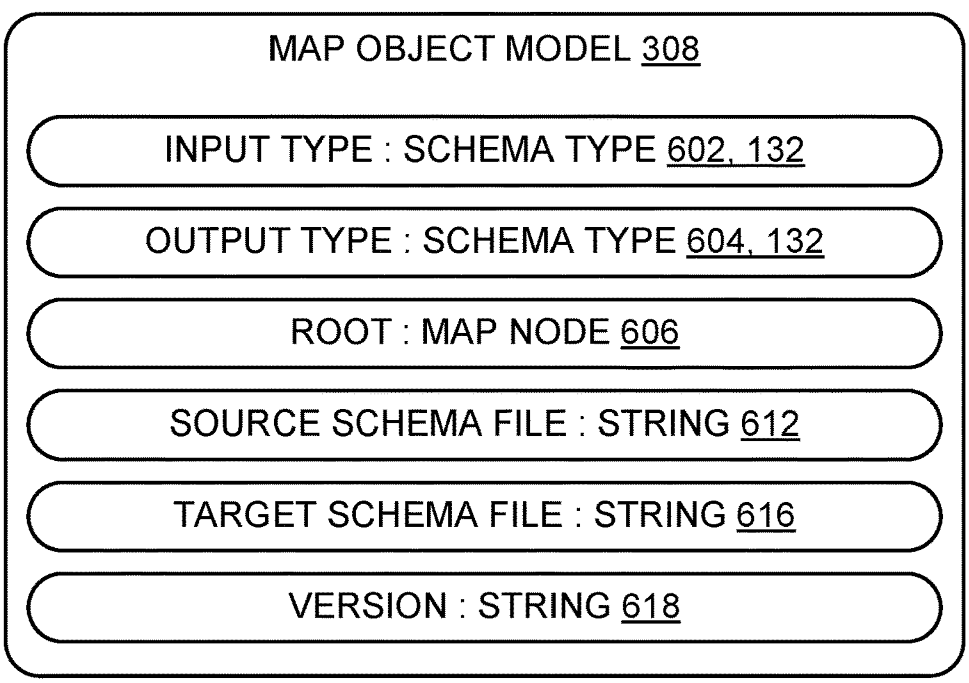
FIG. 7 is a block diagram illustrating a second version of the map object model class.

FIG. 7 shows a second version of the map object model class. This version differs from the FIG. 6 version by omission of the namespace dictionary 610 members 1422, source namespace 608, and target namespace 614. Other versions of the map object model class are characterized by different or additional omissions, as discussed above, but for concision these additional versions are not shown per se in the Figures.

Figure 8:
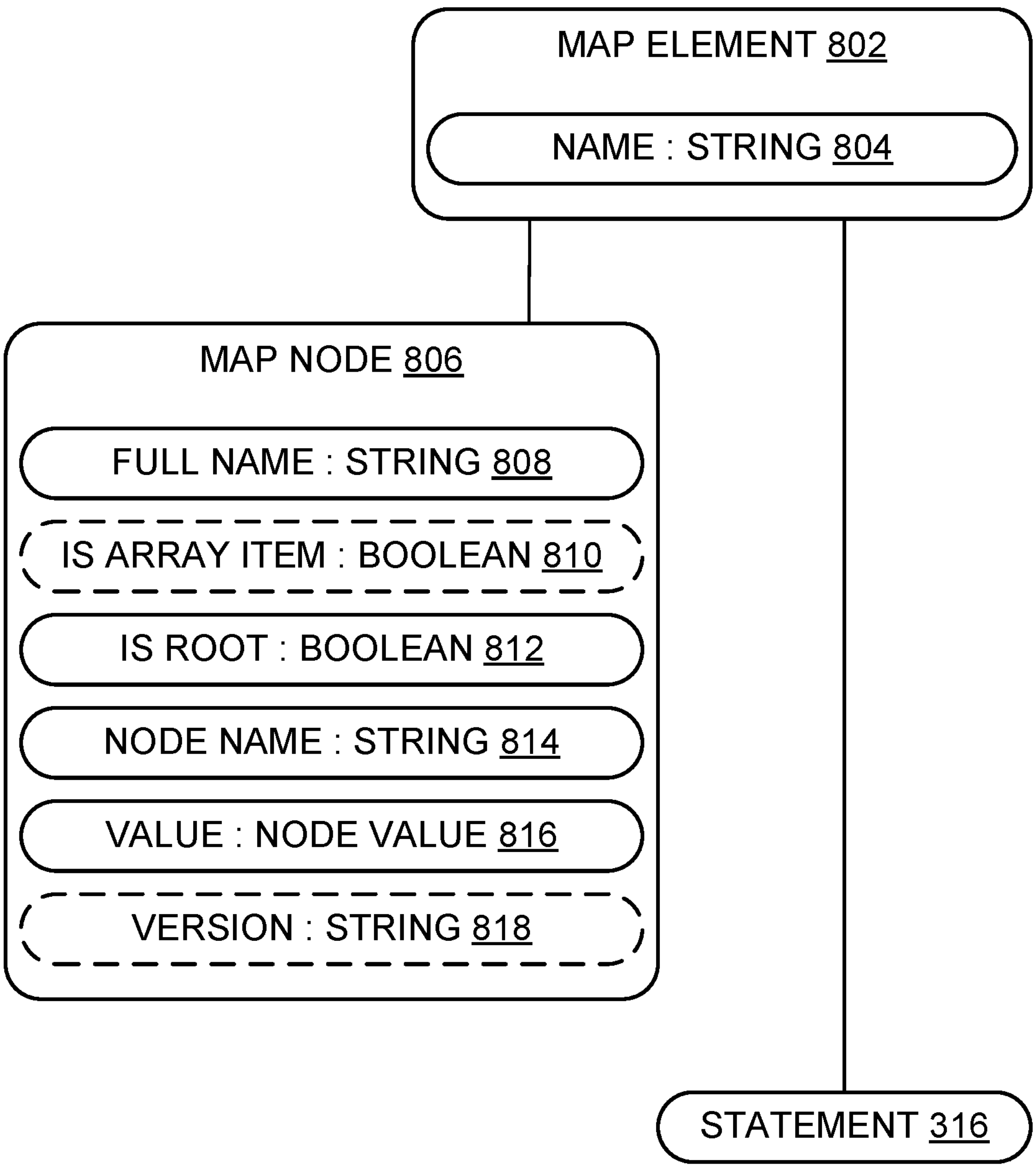
FIG. 8 is a class hierarchy diagram illustrating a map element abstract class, a map node class, and a statement abstract class.

FIG. 8 shows a class hierarchy including a map element abstract class 802 having a name member 804, a map node class 806, and a statement abstract class 316. Classes are non-abstract unless described as abstract. Only non-abstract classes are instantiated into objects 314. As indicated by dashed lines, some variations of the map node class 806 omit the version member 818, some variations omit the is-array-item member 810, and some omit both.

FIG. 9 shows a class hierarchy including the statement abstract class, a for-each statement class 902 which is an example of an iterator statement class (also referred to with numeral 902), and an if-else statement class 910 which is an example of a conditional statement class (also referred to with numeral 910). Although for-each iteration is shown, variations which are not shown include objects for different or additional iterations, such as repeat-until iteration, while-do iteration, or loop-exit iteration. Likewise, although if-else conditionality is shown, variations which are not shown include objects for different or additional conditionality, such as case or switch conditionality.

Figure 10:
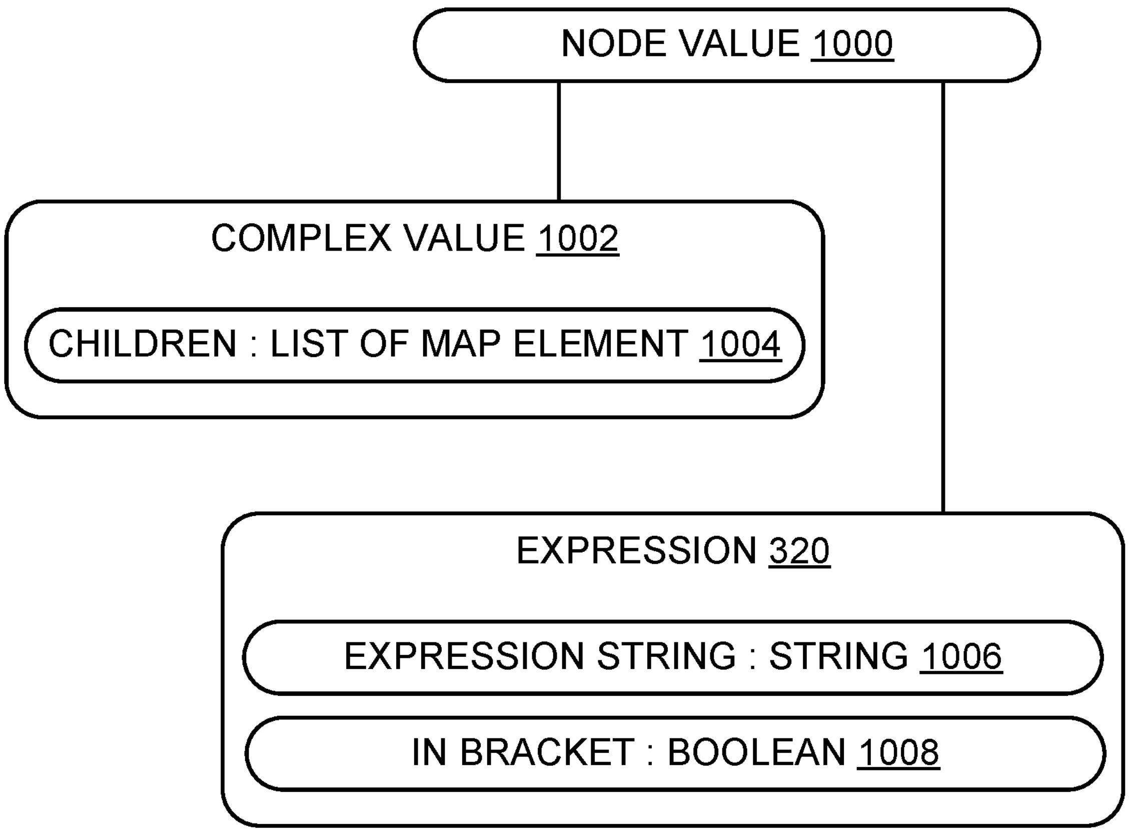
FIG. 10 is a class hierarchy diagram illustrating a node value abstract class, a complex value class, and an expression abstract class.

FIG. 10 shows a class hierarchy including a node value abstract class 1000, a complex value class 1002, and an expression abstract class 320. The complex value 1002 includes a member 1004 named children 1004 which is a list 1424 of map elements 802. Since map element is an abstract class (see FIG. 8 and discussion thereof), this is understood to be a list of map nodes 806 or statements 316. Statement 316 is also an abstract class (see FIG. 9 and discussion thereof), so children 1004 is understood to be a list 1424 of length one or more, which includes zero or more map nodes 806, zero or more iterator statements 902, and zero or more conditional statements 910.

Figure 11:
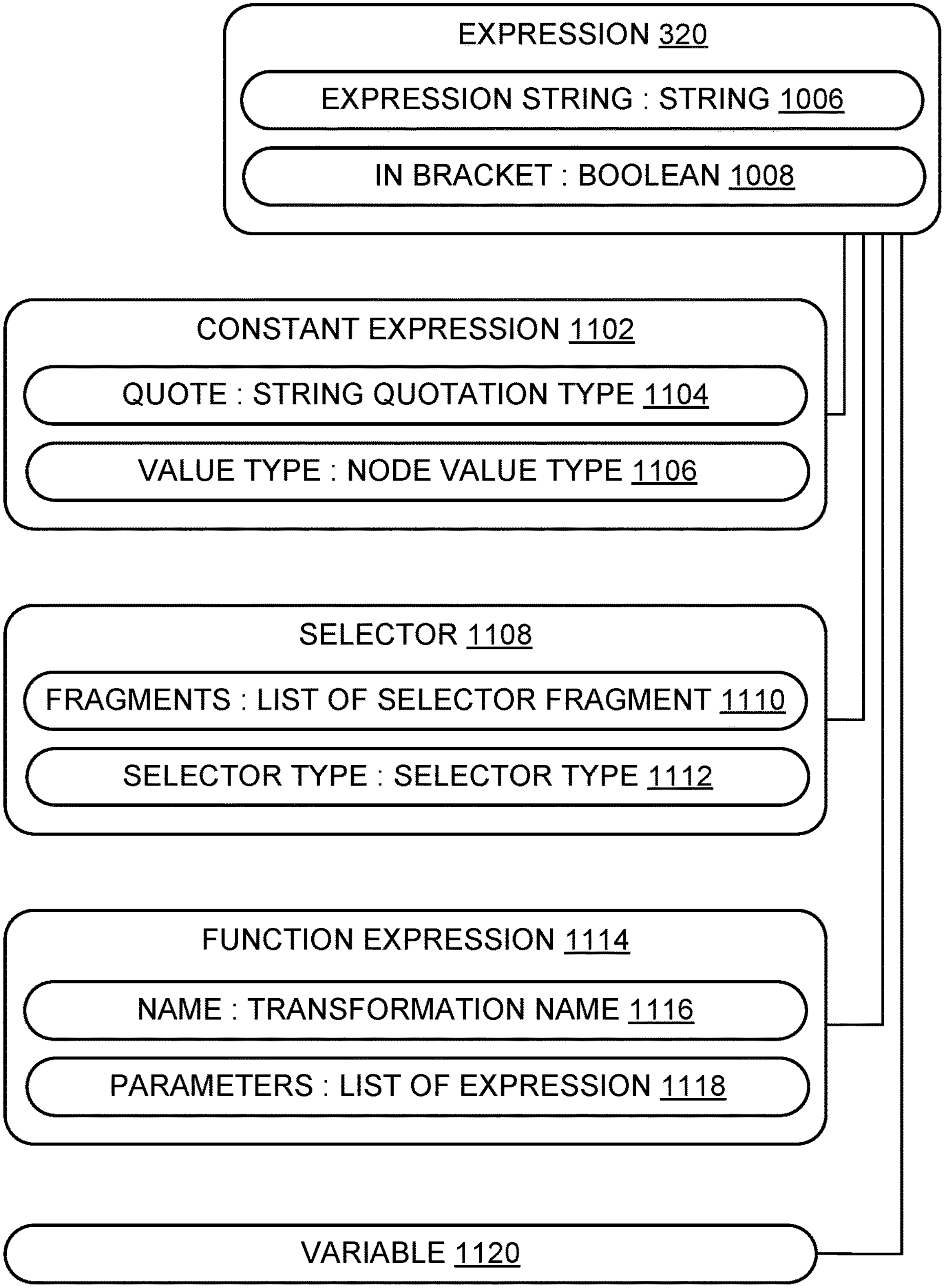
FIG. 11 is a class hierarchy diagram illustrating the expression abstract class, a constant expression class, a selector class, a function expression class, and a variable class.

FIG. 11 shows a class hierarchy including the expression abstract class 320, a constant expression class 1102, a selector class 1108, a function expression class 1114, and a variable class 1120. The bracket of expression class in-bracket member 1008 may correspond to any bracketing pair of characters, e.g., <and >, [and], {and}, or (and). Some examples of such characters include brackets, braces, and parentheses. In constant expression class member quote 1104, StringQuotationType is an Enum having values "SingleQuote" and "DoubleQuote". A double quoted string may contain a single quote, or vice versa, for instance, "This is Pat's birthday!" is a constant expression double quoted value. In Selector class, "SelectorType" is used both as a member name and as a type. The C#programming language, for instance, supports this kind of construct. SelectorType type is an Enum having values "Absolute" and "Relative".

Figure 12:
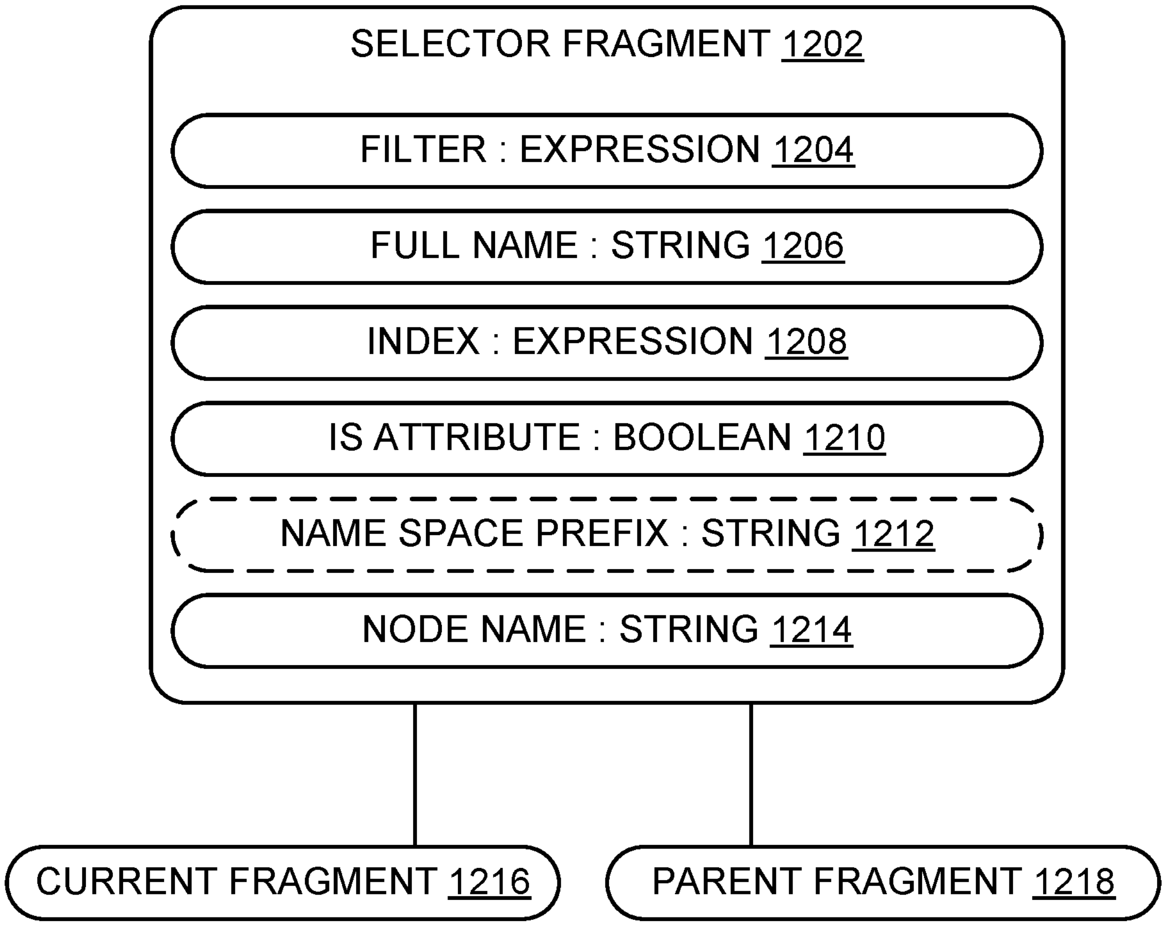
FIG. 12 is a class hierarchy diagram illustrating a selector fragment class, a current fragment class, and a parent fragment class.

FIG. 12 shows a class hierarchy including a selector fragment class 1202, a current fragment class 1216, and a parent fragment class 1218. As indicated by the dashed line, a variation of the selector fragment class 1202 omits the name space prefix member 1212.

Figure 13:
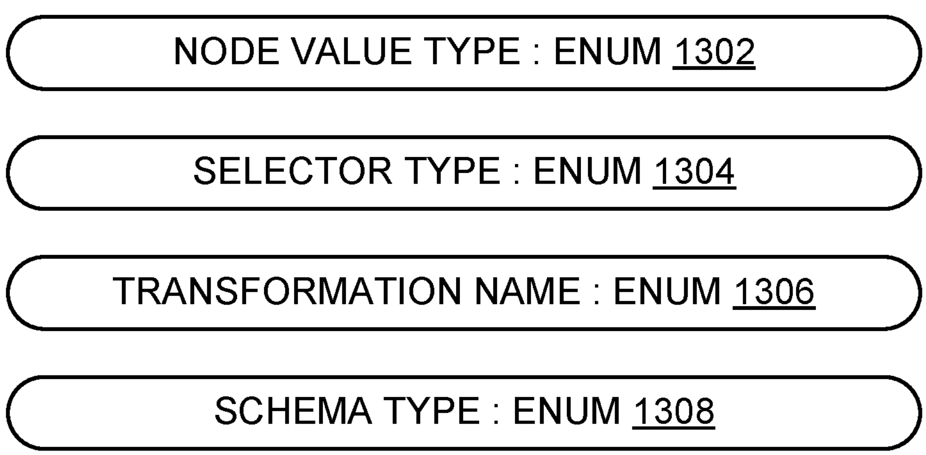
FIG. 13 is a class hierarchy detail diagram illustrating some enumeration ("enum") data types referenced in class hierarchy diagrams.

FIG. 13 shows some class hierarchy detail, including some enumeration ("enum") data types referenced in the class hierarchy diagrams.

In some embodiments, an element hierarchy is rooted at an element class 802, which has node class 806 and statement class 316 children. The node class has a node value member 816. An XML node is an example child of the node class. The statement class has a for class 902 and an if class 910 as children. The for class has a collection (selector) member and an each (node) member. The if class has a condition (expression) member and a node value member. A node value hierarchy is rooted at a node value class 1000. The node value class has a complex value class 1002 and an expression class 320 as children. The complex value class has an elements member 1004. The expression class has a constant class 1102, a function class 1114, a selector class 1108, and a variable class 1120 as children. The function class has a parameters (expression) member 1118. The selector class has a selector fragment member 1110.

Processes (a.k.a. Methods)

Processes (which are also be referred to as "methods" in the legal sense of that word) are illustrated in various ways herein, both in text and in drawing figures. FIGS. 15, 16, and 17 each illustrate a family of methods 1500, 1600, and 1700 respectively, which are performed or assisted by some enhanced systems, such as some systems 202 or another message transformation enhanced system as taught herein. Method family 1500 and method family 1600 are each a proper subset of method family 1700.

FIGS. 1 to 14 illustrate system 202 architectures with implicit or explicit actions, e.g., searching a file system, opening files, reading data from a file, writing data to a file, lexically analyzing and parsing message schema textual definitions such as XML or JSON text, or otherwise processing data 118, in which the data 118 includes, e.g., schema file content 130, transformation rule file content 406, and messages 128, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types in file name. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 17. FIG. 17 is a supplement to the textual examples of embodiments provided herein and the textual descriptions of embodiments provided herein. In the event of any alleged inconsistency, lack of clarity, or excessive breadth due to an aspect or interpretation of FIG. 17, the text of this disclosure shall prevail over that aspect or interpretation of FIG. 17.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 1700 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 17 to be non-operable, the sequence S is not within the scope of any claim. Any assertion otherwise is contrary to the present disclosure.

Some embodiments provide or utilize a method 1700 performed by a computing system 202 to transform messages. The method includes building 304 a message transformation map object model 308 in a digital memory 112, the message transformation map object model computationally representing 1702 a transformation rule set 406 which includes at least one transformation rule 124, the message transformation map object model including a transformation rule tree 312 of objects 314. The building 304 includes placing 1502 in the transformation rule tree of objects an outgoing message fragment constructor object 1410, 314 which represents 1704 a construction 1732 of an outgoing message fragment 1412. The building 304 also includes placing 1502 in the transformation rule tree of objects a selector object 1108 which represents 1708 a selection 1734 of an incoming message fragment 1412. The outgoing message fragment constructor is mapped 1602 to the selector object in the transformation rule tree of objects. In some embodiments, the method also includes applying 306 the message transformation map object model to a first incoming message 208, and providing 310 a first outgoing message 210 as a computational result of the applying. "First" here is used to provide context to indicate different incoming messages, not necessarily to mean first in time.

In some embodiments, a message structure (a.k.a. schema) 130 is defined in such a way that variations in individual messages still adhere to the defined structure. Thus, in the FIG. 5 example, one incoming message 208 could and often would contain a different customer name than another incoming message 208, but each incoming message 208 would conform to the incoming message schema 402, 130. A message structure 130 can be specified in one or more formats 132, e.g., as an XML schema, a JSON schema, an X12 format, an EDIFACT schema, etc. Regardless of which formats 132 a given pair of message structures 402 and 404 are defined in, their map object model 308 is structurally and functionally identical, thus making the map object model 308 agnostic to the format of message structure specifications.

In some embodiments, the method includes utilizing 1748 the message transformation map object model agnostically with respect to multiple message schema formats by performing at least one of the following: further applying 306 the message transformation map object model to a second incoming message 208 and further providing 310 a second outgoing message as a computational result of the further applying, wherein the first incoming message has a message structure 402 defined in a first schema format 132, the second incoming message has the message structure 402 defined in a second schema format 132, and the first schema format differs from the second schema format; or further applying 306 the message transformation map object model to a second incoming message and further providing a second outgoing message 210 as a computational result of the further applying, wherein the first outgoing message has a message structure 404 defined in a first schema format 132, the second outgoing message has the message structure 404 defined in a second schema format 32, and the first schema format differs from the second schema format.

In one example, a first incoming message structure format is XML, a second incoming message structure format is X12, and the underlying incoming message structure 402 as represented in the map object model 308 is the same in each case. In another example, a first outgoing message structure format is JSON, a second outgoing message structure format is EDIFACT, and the underlying outgoing message structure 404 as represented in the map object model 308 is the same in each case.

In some embodiments, suitable map object models 308 (plural) can be used to represent incoming messages of various schema formats and various schemas, and be used to produce outgoing messages of various schema formats and various schemas. In some embodiments, the method includes applying 306 a second message transformation map object model 308 to a second incoming message and providing 310 a second outgoing message as a computational result of the applying, the second message transformation map object model includes a second transformation rule tree 312 of objects. The first transformation rule tree of objects differs from the second transformation rule tree of objects, but each transformation rule tree of objects includes a respective outgoing message fragment constructor mapped to a respective selector object.

In some embodiments, the map object model is a representation of the transformation rule that exists separately from the transformation engine. In some, the applying 306 and the providing 310 are performed by a transformation engine 324 during an execution of the transformation engine, the method further includes storing 1720 the message transformation map object model 308 in a nonvolatile storage medium 112, and the message transformation map object model continues to exist 1722 in the nonvolatile storage medium after execution 1724 of the transformation engine has paused or ended or both. By contrast, any internal data structures of a convertor used for message conversion typically exist only while the convertor is executing.

In some embodiments, one or more map object model class hierarchies include recursion. For example, in some embodiments class 1402 definitions create a recursive relationship of the NodeValue class 1000, ComplexValue class 1002, MapElement class 802, and MapNode class 806, or their functional equivalents. Class names in this example and elsewhere herein are for convenience, in the sense that functionally equivalent classes may be implemented using different names than the ones used herein.

In some embodiments, building 304 the message transformation map object model includes placing 1502 in the transformation rule tree of objects a complex value object 1002, 314 which instantiates a complex value class 1002 which is hierarchically below a node value class 1000, the complex value object specifying 1728 a list of at least one map element object 802, 314, each map element object instantiating 1726 a map element class 802 which is hierarchically above a map node class 806, the map node class having a member 1422 whose type 1426 is the node value class 1000.

In some embodiments, building 304 the message transformation map object model includes placing 1502 in the transformation rule tree of objects a selector object 1108, 314 which instantiates 1726 a selector class 1108 which is hierarchically below an expression class 320.

In some embodiments, building 304 the message transformation map object model includes placing 1502 in the transformation rule tree of objects a function expression object 1114, 314 which instantiates 1726 a function expression class 1114 which is hierarchically below an expression class 320.

In some embodiments, building 304 the message transformation map object model includes placing 1502 in the transformation rule tree of objects a variable object 1120, 314 which instantiates 1726 a variable class 1120 which is hierarchically below an expression class 320.

In some embodiments, building 304 the message transformation map object model includes placing 1502 in the transformation rule tree of objects a constant expression object 1102, 314 which instantiates 1726 a constant expression class 1102 which is hierarchically below an expression class 320.

In some embodiments, the MapObjectModel class 308 (or its functional equivalent under a different class name) does not necessarily include namespace members or schema type members. In some embodiments, the namespace itself is available in a message structure, but not all of the namespaces specified in the message structure are necessarily relevant to the mapping 124. In some, namespaces are mapped to a namespace prefix, for brevity and convenience in map object model. Because a map object model merges the incoming and outgoing message namespaces in some embodiments, the prefixes defined in a message structure are often invalid for use by a map object model and therefore namespaces are specified explicitly. In some embodiments, an input message structure identification corresponds to MapObjectModel class members InputType 602 and SourceSchemaFile 612. This is one example of an alternate implementation of MapObjectModel. In some embodiments, schema type 132 is explicit in a map object model, e.g., SchemaType.XML or SchemaType.JSON.

In some embodiments, building 304 the message transformation map object model includes placing 1502 in the transformation rule tree of objects a map object model object 308, 314 which instantiates 1726 a map object model class 308 which includes the following members 1422: incoming message structure identification 602 and 612, and outgoing message structure identification 604 and 616.

In some embodiments, the method 1700 includes ascertaining 1730 the presence of a transformation engine 324, and choosing 1750 at least the transformation rule set or the transformation rule based on the transformation engine.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as classes 1402, objects 314, transformation rule trees 312, message schemas 130, map object models 308, transformation engines 324, and software 302 to build map object models 308, in the form of data 118 and instructions 116, read from a removable storage medium 114 and/or another source such as a network connection, to form a configured storage medium. The configured storage medium 112 is capable of causing a computer system 202 to perform technical process steps for providing or utilizing message transformation functionality 206, as disclosed herein. The Figures thus help illustrate configured storage media embodiments and process (a.k.a. method) embodiments, as well as system and process embodiments. In particular, any of the method steps illustrated in FIG. 4, 15, 16, or 17, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a method 1700 to build 304 a message transformation map object model 308 in a digital memory 112. This method includes placing 1502 in a transformation rule tree 312 of objects an outgoing message fragment constructor object 1410 which represents 1704 a construction 1732 of an outgoing message fragment 1412; placing 1502 in the transformation rule tree 312 of objects a selector object 1108 which represents a selection 1734 of an incoming message fragment 1412, the outgoing message fragment constructor mapped 1602 to the selector object in the transformation rule tree of objects; and placing 1502 in the transformation rule tree 312 of objects at least one of the following objects 314: a conditional statement object 910 representing 1712 a condition 1738 during a message transformation 204, or an iterator statement object 902 representing 1714 an iteration 1740 during the message transformation 204.

In some embodiments, the method further includes placing 1502 in the transformation rule tree 312 of objects at least two of the following objects 314: a constant expression object 1102, a function expression object 1114, or a variable object 1120.

In some embodiments, the method further includes applying 306 the message transformation map object model to transform 204 incoming messages 208 into respective outgoing messages 210, the incoming messages each having a first message structure 402 in a schema format 132, the outgoing messages each having a second message structure 404 in the schema format 132, the first message structure 402 differing from the second message structure 404.

In some embodiments, the method further includes placing 1502 an incoming message namespace identifier 608 in the message transformation map object model 308, and placing 1502 an outgoing message namespace identifier 614 in the message transformation map object model 308.

In some embodiments, the method further includes placing 1502 an incoming message schema type identifier 602 in the message transformation map object model 308, and placing 1502 an outgoing message schema type identifier 604 in the message transformation map object model 308.

Additional Observations

Additional support for the discussion of message transformation functionality 206 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present innovations, has no role in interpreting the claims presented in this patent disclosure. With this understanding, which pertains to all parts of the present disclosure, examples and observations are offered herein.

Some familiar approaches to message transformation provide very limited mechanisms which translate information from a source application to a destination application. These mechanisms are rigid; if a consuming application needs a different translation of the data from what the mechanism generates, then the mechanism source code must be altered, and then it is recompiled and redeployed. For instance, if the consuming application is designed to process an XML document that is formatted according to one schema but the source application produces an XML document that is formatted according to another schema, then the consuming application cannot process the data because it does not recognize the format used by the source application.

Some embodiments described herein use or provide a system by which the target application can request the translation that the target application consumes and the translator 324 can on-the-fly translate from an intermediate in-memory representation 308 to the requested representation. This simplifies the translation effort between data in different formats.

Some embodiments first receive an indication of the source schema and the desired target schema. Then the embodiment creates, on the fly, from a generic set 406 of mapping rules, mapping instructions 1602 that map from the source schema to the target schema. Then these mapping instructions are provided to a mapping engine 324 that applies 306 the mapping 308. The mapping instructions can be provided for a selected mapping engine from a set of supported mapping engines, supporting, e.g., XSLT, Shopify® Liquid (mark of Shopify Inc.), and future-developed mapping engines. An advantage of this capability is avoidance of lock-in to a specific mapping implementation technology. Thus, if an XSLT engine is not desired or is not available, the embodiment can switch over to a mapping instruction suitable to a different mapping engine.

In some embodiments, an object model represents message transformation to abstract it from any particular transformation language and any particular execution engine. Here "abstract" is used in the computing technology sense, not in the legal sense.

In business-to-business or enterprise integration workflows, an outgoing message from a preceding stage is often different from what is expected as input at the next stage. The difference is in message format or structure or both. Therefore, system integrations have a goal of transforming these messages appropriately. An EiPaaS includes tools and techniques that facilitate message transformation. To make the in-memory representation of transform definition agnostic to the transform language and the transform engine, some embodiments taught herein build or use an object model 308 to represent transformation. This object model is also referred to herein as a map object model 308.

In some embodiments, a map object model 308 is an in-memory representation of transformation as a hierarchical object tree, which forms a basis for other components in transformation tools.

In some embodiments, a map object model 308 is implemented using two independent class inheritance hierarchies, such as hierarchies shown piecewise in FIGS. 6 to 13. An Element hierarchy rooted at map element class 802 represents a node or structural creation of a node in the output message. A NodeValue hierarchy rooted at node value class 1000 represents the value of the node in the output message. The node value can be, e.g., a ComplexValue 1002 for a JSON object or for XML complex type records. The node value will be an Expression 320 for leaf nodes in the output message.

In some embodiments, the Element hierarchy represents an output node having its node value, including repeating 902 and optional 910 structural statements. An Xml node is further derived from node 806 to represent an output node of an Xml message. A For statement 902 has an input collection to iterate on, and the nested output node. An If statement 910 has a Boolean conditional expression and the node value output to assign if the conditional expression is true. A complex node value 1002 can represent a nested record structure, e.g., an xml complex type or a json object, and is made with a nesting list of elements as its children 1004. Each of the children in the list 1004 can be a Node or Statement.

In some embodiments, Expressions 320 can be of type Constant expression 1102, Function expression 1114, Selector expression 1108, or variable reference expression 1120. A Function expression represents nested function calls by having its parameters defined as expression type. Selector expressions represent node(s) from input message, which includes a series of selector fragments.

The functions 1432 identified by transformation name 1306 members 1116 of function expression objects 1114 vary between embodiments. Following is a list of routines 1432 which illustrates some of the possibilities; a given embodiment includes N of these routines, with N in the range from zero to the number of routines listed herein. Routine 1432 groupings shown below are not mandatory or canonical. One of skill will also understand that other routines which are not expressly listed herein may be employed in a given embodiment.

max($input1,$input2), wherein input1 is a repeating numeric node/expression, input2 is an OPTIONAL scoping node, an input constraint is Repeating Node, and output type is number. Returns a value that is equal to the highest value appearing in the input sequence/expression presented in param1. If optional 2nd param is specified, returns the max of expression in param1 over the range specified by param2. Some similar routines 1432 include min($input1,$input2), avg($input1,$input2), sum($input1,$input2), abs($input1), round($input1, $input2), floor($input1), ceiling($input1), sqrt($input1), exp10($input1), exp($input1), log($input1), log 10($input1), cos($input1), sin($input1), tan($input1), atan($input1), pow($input1, $input2), add($input1, $input, $input3, . . . ), subtract($input1, $input2), multiply($input1, $input2, $input3, . . . ), divide($input1, $input2), modulo ($input1, $input2), integer-divide($input1, $input2), min ($input1,$input2,$input3, . . . ), max($input1, $input2,$input3, . . . ).

count($input1), wherein input1 is a repeating numeric node/expression, an input constraint is Repeating Node, and output type is integer. Returns the number of items in a sequence. A similar routine is string-length($input1).

string-join($input1,$input2,$input3), wherein input1 is any repeating node/expression, input2 is const, and input3 is an OPTIONAL scoping node, an input constraint is Repeating Node, and output type is string. Returns a string created by concatenating the items in a sequence/expression (param1), with a defined separator between adjacent items (param2). If optional 3rd param is specified, returns the join of expression in param1 over the range specified by param3 with param2 as separator. Some similar routines 1432 include concat($input1,$input2,$input3, . . . ), lower-case ($input1), upper-case($input1).

filter, with syntax xpath, wherein input1 is any, input2 is an editbox, an input constraint is Repeating Node, and output type is selector.

current-date( ), wherein output type is date. Returns the current date. For example, a call to date( ) might return 2022-07-12+01:00. The returned date has an associated time zone, which is the same as the implicit time zone in the dynamic context. Some syntactically similar routines include current-date Time( ), current-time( ).

add-days($input1, $input2), wherein input1 is date-time, input2 is number, and output type is date-time. The date format is ISO 8601-compliant. For example, suppose a company fulfills purchase orders within two days of receiving them. When creating a map that creates a purchase order acknowledgment from a purchase order, an embodiment can use the Add Days to add two days to the current date and use that value in the acknowledgment as the date by which the purchase order will be fulfilled.

nil( ), wherein output type is nil. Sets a destination element to Nil. This is useful to include empty elements in the output message.

constant, wherein an input1 is editable, syntax is value as $input2, and output type is string.

is-null($input1), wherein input1 is any, and output type is boolean. Evaluates to Boolean value True if the specified input parameter evaluates to Null; the Boolean value False otherwise. This is used for JSON messages. A syntactically similar routine is is-nil($input1), used for XML messages.

is-date($input1), wherein input1 is string, and output type is boolean. Evaluates to Boolean value True if the specified input parameter evaluates to a valid date; the Boolean value False otherwise. Some similar routines include is-number ($input1), is-equal($input1, $input2), is-less-than($input1, $input2), is-less-than-equal($input1, $input2), and($input1, $input2, $input3 . . . ), not($input1), or($input1, $input2, $input3 . . . ), is-string($input1), not-equal($input1, $input2).

exists($input1), wherein output type is boolean. Evaluates to Boolean value True if the element or attribute that corresponds to the Record, Field Element, or Field Attribute node that is supplied as input1 parameter exists in a particular input instance message; evaluates to Boolean value False otherwise. The node in the source schema to which this is linked is a node that corresponds to an actual element or attribute in an instance message.

contains($input1, $input2), wherein the inputs are strings, and output type is boolean. Returns true if the string specified by input1 contains string specified by input2 as a substring. Some similar routines include starts-with($input1, $input2), ends-with($input1,$input2).

substring($input1, $input2, $input3), wherein input1 is string, input2 and input3 are number, an Input Constraint is sequence of input, and output type is string. Returns the portion of the value of string specified by input1 (parameter1) beginning at the position indicated by the value of parameter2 and continuing for the number of characters indicated by the value of parameter3. Some similar routines include substring-after($input1, $input2), replace($input1, $input2,$input3), trim($input1), trim-left($input1), trim-right($input1).

error($input1,$input2), wherein the inputs are strings, an Input Constraint is sequence of input, and output type is void. Throws an exception with error code specified in parameter1 and description specified by parameter2, and quits transformation.

condition with a syntax $if($input1), wherein input1 is boolean, and output type is output only.

foreach with a syntax $for($input1), wherein input1 is selector, and output type is output only.

number($input1), converts string specified by input parameter into equivalent number and returns as type number.

string($input1), converts number specified by input parameter into equivalent string and returns as type string.

int($input1), converts string specified by input parameter into equivalent integer and returns as type integer.

Some embodiments beneficially provide isolation and modularization, thereby aiding migration of pre-defined maps 124 between users or even between organizations, in the form of persisted map object models 308. By representing integration solution transforms in a formal way, embodiments remove ambiguity otherwise associated with assessing and documenting the capabilities of what is supported by an underlying offering. This serves as a useful aid in doing gap analysis, for example. In some embodiments, map object models 308 can be built from and serialized to any transformation language, including X12 or XSLT, for example.

Some embodiments include or use an integration computing system which supports message transformation for integration of disparate programs, the integration computing system including: a digital memory; a processor in operable communication with the digital memory; a message transformation engine interface to a message transformation engine; and an intermediate representation constructor which upon execution by the processor receives message data from the message transformation engine interface and constructs in the digital memory an intermediate representation of a message, the intermediate representation including an element hierarchy which represents an output message node or a structural creation of the output message node, the intermediate representation also including a node value hierarchy which represents a value of the output message node.

In some circumstances, messages have different language(s) than a transformation language. A particular transformation language could be executed by different execution engines, and a particular execution engine may execute more than one transformation language.

In some embodiments, a map object model is represented by two independent class inheritance hierarchies. The class inheritance hierarchies are independent in that they do not establish any cross references to one another.

In some embodiments, an element hierarchy represents node or structural creation of the node in the output message. In some, below the Element, the hierarchy includes Node and Statement. Statement represents structural creation of the node. In some, element hierarchy represents an output node having its node value, repeating and optional structural statements. In some, the possible structural statements are For Statement, For Statement with Index, and If Statement.

Some embodiments include, provide, or use an integration method for integration of disparate programs 212, the integration method including: getting a source schema identification of a source schema; receiving a target schema identification of a target schema; obtaining a set of mapping rules; creating a mapping from the source schema to the target schema based on the mapping rules; and providing the mapping to a mapping engine 324.

In some Enterprise Integration scenarios, one starts as shown in FIG. 4 with an incoming message structure 402 and an outgoing message structure 404, also called message schemas. These schemas can be represented in various format families, e.g., XSD (XML Schema Definition), JSON, etc. An integration architect faces the task of creating a transformation rule so that output messages can be generated from any incoming message that adheres to given incoming message structure. These are Transformation Rules 124 in the FIG. 4 diagram. These transformation rules can be defined using various available programming constructs and sophisticated tools. These rules can persist in industry standard formats like XSLT, Shopify® Liquid, or various proprietary formats. The preceding steps relate to a development or authoring phase.

During a runtime execution phase, a transformation engine 324 reads the transformation rules 124 into its memory in the form of a Map Object Model 308. Advantageously, regardless of the format chosen to persist the transformation rules 124, the Transformation Engine 324 is able to create a uniform in-memory representation at this phase, as taught herein. After the transformation engine is initialized, it reads the incoming message 208, applies 306 transformation rules stored in the Map Object Model 308, and creates 310 the desired outgoing message 210.

FIG. 5 illustrates, in a human-friendly diagram, an input message structure on the left, an output message structure on the right, and arrows corresponding to Transformation Rules. For this FIG. 5 example, a representative incoming message 208 in XML is:

```
<?xml version="1.0" encoding="utf-8"?>
<Bookstore xmlns="http://sourceuri.dummy">
  <Location xmlns:xsi="http://www.w3.org/2001/XMLSchema-instance"
xsi:nil="false">This</Location>
  <Customer>
    <Name>Name1</Name>
    <Age>1</Age>
    <Active>true</Active>
  </Customer>
  <Customer>
    <Name>Name2</Name>
    <Age>-2147483647</Age>
    <Active>false</Active>
  </Customer>
  <Customer>
    <Name>Name3</Name>
    <Age>2147483647</Age>
    <Active>true</Active>
  </Customer>
  <Book>
    <Name>Name1</Name>
    <Author>Author1</Author>
    <Category>Category1</Category>
    <LocationCode>LocationCode1</LocationCode>
    <Availability>Available</Availability>
  </Book>
  <Book>
    <Name>Name2</Name>
    <Author>Author2</Author>
    <Category>Category2</Category>
    <LocationCode>LocationCode2</LocationCode>
    <Availability>Not Available</Availability>
  </Book>
  <Book>
    <Name>Name3</Name>
    <Author>Author3</Author>
    <Category>Category3</Category>
    <LocationCode>LocationCode3</LocationCode>
    <Availability>Available</Availability>
  </Book>
</Bookstore>
```

The URLs shown herein are for illustration only. They are not intended to import any supporting text or information into the present patent disclosure.

Continuing with the FIG. 5 example, a suitable outgoing message 210 for the incoming message above is:

```
<?xml version="1.0" encoding="UTF-8"?>
<ns0:Report xmlns:ns0="http://targeturi.dummy"
        xmlns:xsi="http://www.w3.org/2001/XMLSchema-instance"
        ns0:IsOnlineStore="false">
  <ns0:Customers>
    <ns0:Name>Name1</ns0:Name>
    <ns0:Name>Name2</ns0:Name>
    <ns0:Name>Name3</ns0:Name>
    </ns0:Customers>
  <ns0:TotalBooks>3</ns0:TotalBooks>
  <ns0:ActiveCustomer>
    <ns0:Name>Name1</ns0:Name>
    <ns0:Age>1</ns0:Age>
  </ns0:ActiveCustomer>
  <ns0:ActiveCustomer>
    <ns0:Name>Name3</ns0:Name>
    <ns0:Age>2147483647</ns0:Age>
  </ns0:ActiveCustomer>
  <ns0:AvailableBook>
    <ns0:BookName>Name1</ns0:BookName>
    <ns0:Author>Author1</ns0:Author>
    <ns0:BookLocation>LocationCode1</ns0:BookLocation>
  </ns0:AvailableBook>
  <ns0:AvailableBook>
    <ns0:BookName>Name3</ns0:BookName>
    <ns0:Author>Author3</ns0:Author>
    <ns0:BookLocation>LocationCode3</ns0:BookLocation>
```

-continued

```
  </ns0:AvailableBook>
  <ns0:Location>This</ns0:Location>
</ns0:Report>
```

Arrows in the FIG. 5 diagram correspond to nesting and selectors in the object model. For instance, the following portion of an object model 308 corresponds to the arrow from the Name under Book on the left side to the BookName under AvailableBook on the right side of the FIG. 5 diagram:

```
new XmlMapNode
{
  NamespacePrefix = "ns0",
  FullName = "ns0:BookName",
  NodeName = "BookName",
  Value = new Selector
  {
    Fragments = new List<SelectorFragment>
    {
      new SelectorFragment
      {
        NodeName = "Name",
        NamespacePrefix = "ns0",
        FullName = "ns0:Name"
      }
    },
    SelectorType = SelectorType.Relative,
    ExpressionString = "ns0:Name",
  },
}
```

In some embodiments, the SelectorType. Relative is only used for nodes in a repeating sequence. In the FIG. 5 example, the Book node is marked as repeating, and a mapping is created from this repeating node to AvailableBook on the right, which is repeating as well. Therefore, the node under Book uses a relative selector.

The FIG. 5 example includes output TotalBooks formed using TransformationName.Count. In some embodiments, count is an example of an aggregator routine 1432. Some other aggregators include sum, min, max, and average. More generally, several dozen TransformationName example routines 1432 are discussed above. They are supported in, and are part of, the map object model 308 in some embodiments. The map object model does not inherently limit every embodiment to some maximum number of routines 1432 or to some particular set of routines 1432.

Similarly, although foreach is an example, it is not the only iterator syntax used in embodiments. Instead of or in addition to foreach syntax, the syntax supported in a map object model could be a while loop syntax, a repeat loop syntax, or some other loop syntax. They each represent mapping a repeating sequence. Likewise, if is an example of a conditional; switch is another example. Either or both may be used for a conditional mapping construct in a map object model.

Unless stated otherwise, however, map object models per se presumptively exclude jump statements. A distinction is also made between a given programming language as such and the object model 308. Unlike the programming language, the map object model 308 is not general purpose. Rather, the map object model 308 is specific to message transformation. At that level of specificity, it is message format agnostic and execution engine agnostic. The map object model 308 is scoped to represent or perform message transformation, e.g., in enterprise integration scenarios. In that scope, there can be one or several programming languages used to represent user inputs. However, it is possible to represent user intent from all these programs into this single object model.

Object models are intermediate representations. Programming languages each have a specific syntax and user readable aspects. The object model exists only inside a computer's memory 112. Map Object Models also presumptively lack libraries, unlike most programming languages. A Map Object Model receives information from an external source, such as a graphical user interface or a program. It provides a kind of a blue print or design for representing message transformation information in an optimal way and allowing for message transformation interactions in a performant way.

Returning to the particular pair of messages 208 and 210 recited above in connection with the FIG. 5 example, FIGS. 18 to 30 collectively show a description of how this transform is represented by a Map Object Model 308. In these Figures, different indentation sizes (1, 2, or 4 characters) are intentionally used, in order to emphasize the flexibility of embodiments and assist compliance with patent drawing format requirements. Different styles for placement of opening braces {are similarly used in these Figures, to emphasize embodiment flexibility and facilitate patent figure formatting compliance. Some opening braces are placed at the end of a line while others are placed on a following line. These different indentation sizes and brace formatting styles are intended to be cosmetic not substantive, unlike, for instance, a substantive difference such as the difference between an XML format 132 and a JSON format 132.

Some embodiments use or provide a method for simplifying translation efforts for translating data in different formats/schemas, comprising: receiving an indication of a source schema and a target schema; creating from a set of mapping rules, mapping instructions that map from the source schema to the target schema; providing the mapping instructions to a selected mapping engine from a set of supported mapping engines that perform mapping; and converting mapping instructions suitable to a different mapping engine if the desired engine is not available.

Some embodiments use or provide a system by which the target application requests the translation that the target application consumes, and the translator translates from an intermediate in-memory representation to the requested representation. A map-object model is developed for an in-memory representation of transformation into a hierarchical object tree. The map object model is represented using two independent class inheritance hierarchies. An element hierarchy represents a node or structural creation of the node in an output message. Then the XML node is derived from the node to represent the output node of the XML message. A NodeValue hierarchy represents the value of the node in the output message. The NodeValue includes a complex value for JSON or complex type records and expressions.

Some embodiments use or provide method for translating a message in a format/structure supported by a destination application, comprising: performing the translation by a translator from an intermediate in-memory representation to the requested representation, wherein: the message translation is done when the structure of the message is different from the supported structure of the destination application; the message translation is done when the format of the message is different from the supported format of the destination application; developing a map-object model for an in-memory representation of transformation into a hierarchical object tree; representing the map object model using two independent class inheritance hierarchies, wherein: an Element hierarchy represents a node or structural creation of the node in an output message, wherein: the element hierarchy represents the output node having its node value, repeating (e.g., for statement has the input collection to iterate on, and the nested output node) or optional structural statements (e.g., If statement has Boolean conditional expression and the node value output to assign if the conditional expression is true). In some, an XML node is further derived from the node to represent the output node of the XML message. In some, a NodeValue hierarchy represents the value of the node in the output message, wherein: the NodeValue is a complex value for JSON or XML complex type records (the complex node value can represent nested record structure, e.g., the xml complex type or the json object, and is made up from a nesting list of elements as its children); the NodeValue is an expression (expressions can be of type Constant expressions, Function expressions, Selector expressions or variable reference expressions) for leaf nodes in the output message.

In some embodiments, the system 202 may be an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system".

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as parsing input messages, instantiating classes into objects, and transmitting output messages, which are each an activity deeply rooted in computing technology. Some of the technical mechanisms discussed include, e.g., software 302, map object models 308, and transformation engines 324.

Some of the technical effects discussed include, e.g., increased uniformity and interchangeability of transformation rule 124 representations, separation of transformation rule 124 representations from convertor source code or transform engine source code 324 (in terms of lifespan, storage location, and maintenance, for example), and independence of transformation rule 124 representations from message schemas 130. Thus, purely mental processes and activities limited to pen-and-paper are clearly excluded. Other advantages based on the technical characteristics of the teachings will also be apparent to one of skill from the description provided.

Different embodiments provide different technical benefits or other advantages in different circumstances, but one of skill informed by the teachings herein will acknowledge that particular technical advantages will likely follow from particular innovation features or feature combinations, as noted at various points herein. Any generic or abstract aspects are integrated into a practical application such as an enterprise integration platform.

Some embodiments described herein address technical challenges of computer technology, and more particularly technical challenges arising in the use of message convertors. Improvements in message transformation functionality promote improvements in the performance, useability, security, and maintainability of software programs that exchange messages 128 using the improved message transformation functionality.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to avoid being locked—in to a specific message schema when mapping an input message to an output message, and how to reduce recompilation and redeployment and their corresponding computational and personnel costs when adding or changing message schema formats or message schemas in an integration. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
AST: abstract syntax tree
BIOS: basic input/output system
CD: compact disc
CPU: central processing unit
DVD: digital versatile disk or digital video disc
EDIFACT: Electronic Data Interchange for Administration, Commerce and Transport
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
IDE: integrated development environment
IL: intermediate language
ISO: international organization for standardization
JSON: JavaScript® Object Notation (mark of Oracle America, Inc.).
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network
XML: extensible Markup Language
XSLT: Extensible Stylesheet Language Transformations Note Regarding Hyperlinks Portions of this disclosure contain URIs, hyperlinks, IP addresses, and/or other items which might be considered browser-executable codes. These items are included in the disclosure for their own sake to help describe some embodiments, rather than being included to reference the contents of the web sites or files that they identify. Applicant does not intend to have these URIs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Some Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 134 may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory. Data 118 is digital data.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" 320 is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Message transformation operations such as instantiating 1726 classes 1402, placing 1502 objects 314 in a transformation tree 312, applying 306 an in-memory map object model 308 to a digital incoming message 208, and many other operations discussed herein (whether recited in the Figures or not), are understood to be inherently digital. A human mind cannot interface directly with a CPU or other processor, or with RAM or other digital storage, to read and write the necessary data to perform the message transformation steps 1700 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

Unless stated otherwise, "first" does not mean first in time. Rather, a "first" item and a "second" item mean one item and another item. For instance, when an embodiment involves a first incoming message and a second incoming message, unless a particular order of arrival is stated either of the messages could have arrived before the other one, or they could have arrived together or simultaneously.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as applying, ascertaining, building, choosing, constructing, executing, identifying, instantiating, iterating, mapping, placing, providing, representing, selecting, specifying, storing, transforming, utilizing (and applies, applied, ascertains, ascertained, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment; includes one or more systems 102
- 101 machine in a system 102, e.g., any device having at least a processor 110 and a memory 112 and also having a distinct identifier such as an IP address or a MAC (media access control) address; may be a physical machine or be a virtual machine implemented on physical hardware
- 102 computer system, also referred to as a "computational system" or "computing system", and when in a network may be referred to as a "node"
- 104 users, e.g., user of an enhanced system 202
- 106 peripheral device
- 108 network generally, including, e.g., LANs, WANs, software-defined networks, clouds, and other wired or wireless networks
- 110 processor or set of processors; includes hardware

112 computer-readable storage medium, e.g., RAM, hard disks

114 removable configured computer-readable storage medium

116 instructions executable with processor; may be on removable storage media or in other memory (volatile or nonvolatile or both)

118 digital data in a system 102; data structures, values, source code, and other examples are discussed herein

120 kernel(s), e.g., operating system(s), BIOS, UEFI, device drivers

122 tool in a computing system, e.g., software development tool, security tool, communication tool, etc.; computational and hence non-human

124 message transformation rule, as represented in a computing system (hence not a mental construct or on paper)

126 display screens, also referred to as "displays"

128 message; digital data in a computing system (hence not a mental construct or on paper)

130 message structure, a.k.a. schema, as represented in a computing system (hence not a mental construct or on paper); also refers to data in such a schema

132 message structure format, a.k.a. schema format or schema type, as represented in a computing system (hence not a mental construct or on paper); also refers to data in such a format

134 cloud, also referred to as cloud environment or cloud computing environment

136 computing hardware not otherwise associated with a reference number 106, 108, 110, 112, 114

202 enhanced computing system, i.e., system 102 enhanced with message transformation functionality as taught herein

204 message transformation as performed by a computing system not by a person; 204 also refers to message transformation as a computational activity or a computational event; one of skill recognizes that message transformation 204 is performed by software and hardware, not by people either mentally or with pen-and-paper; people manifestly lack the speed, accuracy, memory capacity, digital interface capability, and specific processing capabilities required to perform message transformation, as is evident for example in the decades of technical advances in message transformation technology, which would not have been pursued if message transformation was routinely done by mental processes alone

206 message transformation functionality, e.g., software or specialized hardware which performs or is configured to perform step 304, or step 306, or method 1500, or method 1600, or any software or hardware which performs or is configured to perform a novel method 1700 or a computational message transformation activity first disclosed herein

208 incoming message 128, relative to a transformation engine; digital data in a computing system (hence not a mental construct or on paper)

210 outgoing message 128, relative to a transformation engine; digital data in a computing system (hence not a mental construct or on paper)

212 application program in a computing system, or other message consumer or message producer

302 software to build and apply a message map object model

304 computationally build a message map object model

306 computationally apply a message map object model

308 message map object model; data structure in a computing system (hence not a mental construct or on paper); 308 also refers to the map object model class and to objects of that class, as well as to such an object together with a tree 312 identified by the root member 606 of that object 308, 314

310 computationally provide an outgoing message which is a transformation of an incoming message, e.g., via an API

312 message transformation rule tree; data structure in a computing system which represents one or more message transformation rules as a tree of objects 314 instantiated from one or more message transformation class hierarchy classes

314 object instantiated from a message transformation class; data structure in a computing system (hence not a mental construct or on paper); also referred to as an instance or an instantiation of the class

316 statement in a message transformation rule tree; digital; refers to object or inherited class

318 statement object 314 in a message transformation rule tree; digital

320 expression in a message transformation rule tree; digital; refers to object or class

322 expression object 314 in a message transformation rule tree; digital

324 message transformation engine; computational (hence not a mental construct, mental process, paper construct, or pen-and-paper process); also referred to as translator or mapping engine

326 interface in a computing system

400 message transformation architecture, as embodied in a computing system

402 incoming message schema 130; digital data in a computing system (hence not a mental construct or on paper)

404 outgoing message schema 130; digital data in a computing system (hence not a mental construct or on paper)

406 set of one or more message transformation rules; digital

500 example message transformation rule; by convenience or convention may also be considered an example set of message transformation rules, e.g., a rule 124 may be defined in a given embodiment to correspond to one arrow in FIG. 5 with its starting and ending schema fields, or a rule 124 may be defined to correspond to several but not all of the arrows in FIG. 5 with their starting and ending schema fields, or a rule 124 may be defined to correspond to all of the arrows in FIG. 5 with their starting and ending schema fields

602 map object model input schema type member 1422; digital; as with other members herein, may also refer to the data 118 stored in that member

604 map object model output schema type member; digital

606 map object model tree 312 root node identifier member; digital

608 map object model source message namespace identifier member; digital

610 dictionary data type; digital

612 map object model source schema file identifier member; digital

614 map object model target message namespace identifier member; digital

616 map object model target schema file identifier member; digital

618 map object model version identifier member; digital
802 map element class; digital
804 map element name member; digital
806 map node class or object; digital
808 map node full name member; digital
810 map node is-array-item member; digital
812 map node is-root member; digital
814 map node node name member; digital
816 map node value member; digital
818 map node version member; digital
902 for-each or other iterator statement; digital; refers to object or class
904 iterator full name member; digital
906 iterator is-array-item member; digital
908 iterator is-root member; digital
910 if-else or other conditional statement; digital; refers to object or class
912 else statement; digital
914 list of if statement(s); digital
1000 node value class; digital
1002 complex value class or object; digital
1004 complex value children member, also called elements; digital
1006 expression class or object expression string member; digital
1008 expression in-bracket member; digital
1102 constant expression class or object; digital
1104 constant expression quote member; digital
1106 constant expression value type member; digital
1108 selector class or object; digital
1110 selector fragments member; digital
1112 selector type member; digital
1114 function expression class or object; digital
1116 function transformation routine name member; digital
1118 function transformation routine parameters member; digital; as with other lists herein, a list presumptively includes one or more items
1120 variable class or object; digital
1202 selector fragment class or object; digital
1204 selector fragment filter member; digital
1206 selector fragment full-name member; digital
1208 selector fragment index member; digital
1210 selector fragment is-attribute member; digital
1212 selector fragment namespace prefix member; digital
1214 selector fragment node name member; digital
1216 current fragment class or object; digital
1218 parent fragment class or object; digital
1302 node value type enum data type or value; digital
1304 selector type enum data type or value; digital
1306 transformation routine name enum data type or value; digital
1308 schema type enum data type or value; digital
1402 message transformation class; digital
1406 message transformation tree node; digital
1408 message transformation tree edge, sometimes referred to as link; digital
1410 message transformation tree constructor; digital
1412 message 128 fragment; digital
1416 identifier, e.g., name, pointer, index, handle, address; digital
1418 position in tree or other hierarchy, as represented in a computing system, e.g., above, below, parent of, child of
1420 tree or other hierarchy, as represented in a computing system
1422 class or object member; digital; may also be called a field
1424 list; digital; presumed to include one or more items
1426 data type, e.g., string, Boolean, integer, or a class; digital
1428 field; member of an object 314
1430 value; digital; may be a simple type value like a string or number, or a multi-item value such as an object
1432 message transformation routine; computational
1434 enumeration type value; digital; an example of a value 1430
1500 flowchart; 1500 also refers to message transformation methods that are illustrated by or consistent with the FIG. 15 flowchart
1502 computationally place a value 1430 in a map object model
1600 flowchart; 1600 also refers to message transformation methods that are illustrated by or consistent with the FIG. 16 flowchart
1700 flowchart; 1700 also refers to message transformation methods that are illustrated by or consistent with the FIG. 17 flowchart, which incorporates the FIG. 15 flowchart and FIG. 16 flowchart and other steps taught herein
1702 computationally represent a message transformation rule, e.g., in a map object model, tree, or another data structure
1704 computationally represent construction, e.g., in a tree representation such as the listing in FIGS. 18 to 30
1706 computationally represent execution of a statement, e.g., as part of step 1702
1708 computationally represent selection of data such as an incoming message fragment, e.g., as part of step 1702
1710 computationally represent expression, e.g., as part of step 1702
1712 computationally represent a condition or conditionality of a statement, e.g., as part of step 1702
1714 computationally represent iteration or iterational nature of a statement, e.g., as part of step 1702
1716 computationally identify a node, e.g., using an identifier 1416
1718 computationally represent or determine the presence of a difference in two pieces of data 118
1720 computationally store data 118 in a memory 112
1722 computationally represent or determine or cause the existence of data 118
1724 computationally execute a transformation engine 324
1726 computationally instantiate a class 1402 as an object 314
1728 computationally specify a list 1424
1730 computationally ascertain a presence of some transformation engine 324, or computationally ascertain a presence of a transformation engine 324 having a particular capability, e.g., XML recognition, depending on the embodiment
1732 computational construction of a portion of an outgoing message; computational activity or result thereof
1734 computational selection of a portion of an incoming message; computational activity or result thereof
1736 computational execution of a statement in a message transformation tree 312; computational activity or result thereof

1738 computational condition of or in a statement in a message transformation tree 312; computational activity or result thereof

1740 computational iteration per a statement in a message transformation tree 312; computational activity or result thereof

1742 computational expression in a message transformation tree 312; computational activity or result thereof

1744 computationally specify a value 1430

1746 computationally specify a routine 1432

1748 computationally utilize a map object model agnostically

1750 computationally choose one or more transformation rules for execution or for avoidance of execution

1752 any step or item discussed in the present disclosure that has not been assigned some other reference numeral; 1752 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

In some embodiments, message transformation rules 124 for integration platforms are represented in a computing system 202 using transformation rule trees 312 of objects 314 in map object models 308. The transformation rule tree 312 is an intermediate representation of the transformation rule 124. The objects 314 in the tree 312 are instantiated 1726 from classes 1402 of one or more message transformation class hierarchies 1420. Some example classes 1402 include iterator statement 902, conditional statement 910, and expression classes 320. Some example expression classes 320 include constant 1102, variable 1120, function 1114, and selector 1108 classes. In a message transformation architecture 400, transformation rules 124 map 1602 incoming message schemas 402 to outgoing message schemas 404. Transformation engines 324 transform 204 incoming messages 208 to outgoing messages 210 by applying 306 the map object models 308 to select 1734, 304 data fragments 1412 of an incoming message 208 and construct 1732, 304 an outgoing message 210, from the fragments 1412 and from computational results of routines 1432 invoked on the fragments. Map object models 308 are not dependent on particular formats 132 for schema definitions.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/ or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system comprising:

a memory;

a processor set including at least one processor, the processor set in operable communication with the digital memory; and a first message transformation map object model and a second message transformation object model residing in and configuring the memory, the first message transformation map object model representing a first transformation rule set which includes at least one transformation rule, the first message transformation map object model comprising a first transformation rule tree of objects, the first transformation rule tree of objects comprising a first outgoing message fragment constructor object which represents a construction of a first outgoing message fragment of a first outgoing message based on a first outgoing message structure of the first outgoing message, the first outgoing message fragment constructor object mapped to a first selector object which represents a selection of a first incoming message fragment of a first incoming message based on a first incoming message structure of the first incoming message, the second message transformation map object model comprising a second transformation rule tree of objects that differs from the first transformation rule tree of objects, the second transformation rule tree of objects comprising a second outgoing message fragment constructor object mapped to a second selector object.

2. The computing system of claim 1, further comprising a transformation engine which is configured to upon execution apply the transformation rule set to the incoming message.

3. The computing system of claim 1, wherein the transformation rule tree of objects further comprises at least one of:

a conditional statement object representing a conditional statement execution to conditionally perform transformation upon an application of the transformation rule set to the incoming message; or an iterator statement object representing an iterator statement execution to iteratively perform transformation upon an application of the transformation rule set to the incoming message.

4. The computing system of claim 1, wherein the transformation rule tree of objects further comprises at least one of:

a constant expression object representing a constant expression upon an application of the transformation rule set to the incoming message, the constant expression object specifying a constant value and a constant value type; or a function expression object representing a function expression upon an application of the transformation rule set to the incoming message, the function expression object specifying a transformation routine.

5. A method performed by a computing system, the method comprising:

building a message transformation map object model in a digital memory, the message transformation map object model computationally representing a transformation rule set which includes at least one transformation rule, the message transformation map object model comprising a transformation rule tree of objects;

the building comprising placing in the transformation rule tree of objects an outgoing message fragment constructor object which represents a construction of an outgoing message fragment;

the building further comprising placing in the transformation rule tree of objects a selector object which represents a selection of an incoming message fragment, the outgoing message fragment constructor object mapped to the selector object in the transformation rule tree of objects;

the building further comprising placing in the transformation rule tree of objects at least one of the following:

a complex value object which instantiates a complex value class which is hierarchically below a node value class, the complex value object specifying a map element object that instantiates a map element class which is hierarchically above a map node class, the map node class having a member whose type is the node value class;

a selector object which instantiates a selector class which is hierarchically below an expression class;

a function expression object which instantiates a function expression class which is hierarchically below the expression class;

a variable object which instantiates a variable class which is hierarchically below the expression class;

a constant expression object which instantiates a constant expression class which is hierarchically below the expression class; or a map object model object which instantiates a map object model class which comprises an incoming message structure identification and an outgoing message structure identification; and providing a first outgoing message by applying the message transformation map object model to a first incoming message.

6. The method of claim 5, further comprising utilizing the message transformation map object model agnostically with respect to multiple message schema formats by performing the following:

providing a second outgoing message by applying the message transformation map object model to a second incoming message, wherein at least one of the following:

the first incoming message has a message structure defined in a first schema format, the second incoming message has the message structure defined in a second schema format, and the first schema format differs from the second schema format; or the first outgoing message has a message structure defined in a first schema format, the second outgoing message has the message structure defined in a second schema format, and the first schema format differs from the second schema format.

7. The method of claim 5, further comprising:

providing a second outgoing message by applying a second message transformation map object model to a second incoming message, wherein the second message transformation map object model comprises a second transformation rule tree of objects, the transformation rule tree of objects differs from the second transformation rule tree of objects, and the second transformation rule tree of objects includes a respective outgoing message fragment constructor object mapped to a respective selector object.

8. The method of claim 5, wherein providing the first outgoing message is performed by a transformation engine during an execution of the transformation engine, wherein the method further comprises storing the message transformation map object model in a nonvolatile storage medium, and wherein the message transformation map object model continues to exist in the nonvolatile storage medium after execution of the transformation engine has paused or ended or both.

9. The method of claim 5, wherein building the message transformation map object model comprises placing in the transformation rule tree of objects the complex value object which instantiates the complex value class which is hierarchically below the node value class.

10. The method of claim 5, wherein building the message transformation map object model comprises placing in the transformation rule tree of objects the selector object which instantiates the selector class which is hierarchically below the expression class.

11. The method of claim 5, wherein building the message transformation map object model comprises placing in the transformation rule tree of objects the function expression object which instantiates the function expression class which is hierarchically below the expression class.

12. The method of claim 5, wherein building the message transformation map object model comprises placing in the transformation rule tree of objects the variable object which instantiates the variable class which is hierarchically below the expression class.

13. The method of claim 5, wherein building the message transformation map object model comprises placing in the transformation rule tree of objects the constant expression object which instantiates the constant expression class which is hierarchically below the expression class.

14. The method of claim 5, wherein building the message transformation map object model comprises placing in the transformation rule tree of objects the map object model object which instantiates the map object model class which comprises the incoming message structure identification and the outgoing message structure identification.

15. The method of claim 5, further comprising ascertaining the presence of a transformation engine, and choosing at least the transformation rule set or the transformation rule based on the transformation engine.

16. A computer-readable storage device configured with data and instructions which upon execution by a processor cause a computing system to perform operations, the operations comprising:

placing in a first transformation rule tree of objects, which is comprised in a first message transformation map object model, a first outgoing message fragment constructor object which represents a construction of a first outgoing message fragment;

placing in the first transformation rule tree of objects a first selector object which represents a selection of a first incoming message fragment, the first outgoing message fragment constructor object mapped to the first selector object in the first transformation rule tree of objects;

placing in a second transformation rule tree of objects, which is comprised in a second message transformation map object model, a second outgoing message fragment constructor object which represents a construction of a second outgoing message fragment; and placing in the second transformation rule tree of objects a second selector object which represents a selection of a second incoming message fragment, the second outgoing message fragment constructor object mapped to the second selector object in the second transformation rule tree of objects.

17. The computer-readable storage device of claim 16, wherein the operations further comprise placing in the transformation rule tree of objects at least two of the following objects: a constant expression object, a function expression object, or a variable object.

18. The computer-readable storage device of claim 16, wherein the operations further comprise placing an incoming message namespace identifier in the message transformation map object model, and placing an outgoing message namespace identifier in the message transformation map object model.

19. The computer-readable storage device of claim 16, wherein the operations further comprise placing an incoming message schema type identifier in the message transformation map object model, and placing an outgoing message schema type identifier in the message transformation map object model.

20. The computer-readable storage device of claim 16, wherein the operations further comprise placing in the first transformation rule tree of objects at least one of the following objects: a conditional statement object representing a condition during a message transformation, or an iterator statement object representing an iteration during the message transformation.

* * * * *